United States Patent
Maurer et al.

(10) Patent No.: US 12,327,290 B2
(45) Date of Patent: Jun. 10, 2025

(54) NET SETTLEMENT OF SUBROGATION CLAIMS USING A DISTRIBUTED LEDGER

(71) Applicants: STATE FARM MUTUAL AUTOMOBILE INSURANCE COMPANY, Bloomington, IL (US); United Services Automobile Association (USAA), San Antonio, TX (US)

(72) Inventors: Ryan Maurer, Phoenix, AZ (US); Nolan White, Chandler, AZ (US); Kyle D. Weber, Gilbert, AZ (US); Edward Austin, Scottsdale, AZ (US); William Guthrie, Mesa, AZ (US); Dustin Helland, Morton, IL (US); Bharat Prasad, San Antonio, TX (US); Sharon Kay Haverlah, Bulverde, TX (US); Karen Marie Shackelford-George, San Antonio, TX (US)

(73) Assignees: STATE FARM MUTUAL AUTOMOBILE INSURANCE COMPANY, Bloomington, IL (US); United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/433,608

(22) Filed: Feb. 6, 2024

(65) Prior Publication Data
US 2024/0212078 A1 Jun. 27, 2024

Related U.S. Application Data

(63) Continuation of application No. 17/896,617, filed on Aug. 26, 2022, now Pat. No. 11,922,526, which is a
(Continued)

(51) Int. Cl.
*G06Q 50/18* (2012.01)
*G06F 16/23* (2019.01)
*H04L 9/32* (2006.01)

(52) U.S. Cl.
CPC ......... *G06Q 50/18* (2013.01); *G06F 16/2365* (2019.01); *H04L 9/3236* (2013.01)

(58) Field of Classification Search
CPC ....... G06F 16/2365; G06Q 50/18; H04L 9/50; H04L 9/3236
See application file for complete search history.

(56) References Cited

U.S. PATENT DOCUMENTS

| 6,029,146 A | 2/2000 | Hawkins et al. |
| 7,249,114 B2 | 7/2007 | Burchetta et al. |
| (Continued) | | |

FOREIGN PATENT DOCUMENTS

| AU | 2009212995 A1 | 3/2010 |
| WO | WO-2004044696 A2 | 5/2004 |
| (Continued) | | |

OTHER PUBLICATIONS

U.S. Appl. No. 17/530,030, Notice of Allowance, mailed Jun. 3, 2022.
(Continued)

*Primary Examiner* — Etienne P Leroux
(74) *Attorney, Agent, or Firm* — MARSHALL, GERSTEIN & BORUN LLP

(57) ABSTRACT

Aspects of distributed ledger technology are leveraged to verify subrogation settlements. In particular, two parties to a subrogation claim provide cryptographic hashes to a subrogation demand smart contract stored at an address on a blockchain. The subrogation demand smart contract determines that the parties have reached an agreement by determining that the cryptographic hashes match. A settlement
(Continued)

amount from the subrogation claim may be appended to a set of settlement amounts to determine a net settlement amount to facilitate a single payment between the parties on a periodic basis, such as daily, to alleviate the need for the parties to send or receive a payment for each individual settlement amount.

19 Claims, 15 Drawing Sheets

Related U.S. Application Data continuation of application No. 17/530,030, filed on Nov. 18, 2021, now Pat. No. 11,461,861.

(60) Provisional application No. 63/196,516, filed on Jun. 3, 2021, provisional application No. 63/196,544, filed on Jun. 3, 2021.

(56) References Cited

U.S. PATENT DOCUMENTS

| | | | |
|---|---|---|---|
| 7,574,596 B2 | 8/2009 | Chen et al. | |
| 7,962,385 B2 | 6/2011 | Falk et al. | |
| 10,454,878 B2 | 10/2019 | Khan et al. | |
| 10,600,009 B1 | 3/2020 | Augustine et al. | |
| 10,606,669 B2 | 3/2020 | Jacobs et al. | |
| 10,796,393 B2 | 10/2020 | Messerges et al. | |
| 10,824,746 B1 | 11/2020 | Magerkurth et al. | |
| 10,872,381 B1* | 12/2020 | Leise | H04W 4/38 |
| 10,885,590 B2 | 1/2021 | Sivakumar et al. | |
| 10,891,694 B1 | 1/2021 | Leise et al. | |
| 10,929,931 B1 | 2/2021 | Bryant et al. | |
| 10,949,926 B1 | 3/2021 | Call et al. | |
| 10,963,966 B1 | 3/2021 | Brandmaier et al. | |
| 11,037,246 B1 | 6/2021 | Leise et al. | |
| 11,100,477 B1 | 8/2021 | Kemper et al. | |
| 11,170,388 B1 | 11/2021 | Violette et al. | |
| 11,216,813 B1 | 1/2022 | Delong et al. | |
| 11,245,534 B2 | 2/2022 | Brownlee et al. | |
| 11,250,466 B2 | 2/2022 | Soundararajan et al. | |
| 11,374,739 B2* | 6/2022 | Huang | H04L 9/3242 |
| 11,829,961 B1* | 11/2023 | Wood | H04L 9/50 |
| 2001/0037204 A1 | 11/2001 | Horn et al. | |
| 2005/0138429 A1 | 6/2005 | Miura | |
| 2007/0245159 A1 | 10/2007 | Youn | |
| 2008/0071664 A1 | 3/2008 | Silverman et al. | |
| 2016/0292672 A1 | 10/2016 | Fay et al. | |
| 2017/0186057 A1 | 6/2017 | Metnick | |
| 2017/0308893 A1 | 10/2017 | Saraniecki | |
| 2017/0357921 A1 | 12/2017 | Glucroft | |
| 2017/0372432 A1 | 12/2017 | McKown | |
| 2018/0025442 A1 | 1/2018 | Isaacson et al. | |
| 2018/0046992 A1 | 2/2018 | Hanrahan et al. | |
| 2018/0091316 A1 | 3/2018 | Stradling et al. | |
| 2018/0218455 A1 | 8/2018 | Kolb et al. | |
| 2018/0365684 A1 | 12/2018 | Reilly et al. | |
| 2019/0019186 A1 | 1/2019 | Falah et al. | |
| 2019/0026821 A1 | 1/2019 | Bathen et al. | |
| 2019/0102736 A1 | 4/2019 | Hudson | |
| 2019/0149864 A1 | 5/2019 | Britt et al. | |
| 2019/0197620 A1 | 6/2019 | Jayaram et al. | |
| 2019/0354966 A1 | 11/2019 | Himura et al. | |
| 2019/0392437 A1 | 12/2019 | Castagna et al. | |
| 2019/0392438 A1 | 12/2019 | Rice | |
| 2020/0058071 A1 | 2/2020 | Yang | |
| 2020/0065763 A1 | 2/2020 | Rosinzonsky et al. | |
| 2020/0065802 A1 | 2/2020 | Mathieson et al. | |
| 2020/0177373 A1 | 6/2020 | Komandur et al. | |
| 2020/0226677 A1 | 7/2020 | Dhawan et al. | |
| 2020/0250753 A1 | 8/2020 | Blount | |
| 2020/0272966 A1 | 8/2020 | Kirkegaard | |
| 2020/0273027 A1 | 8/2020 | Gordon et al. | |
| 2020/0279328 A1 | 9/2020 | Zhiri et al. | |
| 2020/0320638 A1* | 10/2020 | Erickson | G06N 20/00 |
| 2020/0341971 A1 | 10/2020 | Krishnaswamy et al. | |
| 2020/0394321 A1 | 12/2020 | Ramos et al. | |
| 2020/0394322 A1 | 12/2020 | Ramos et al. | |
| 2020/0409937 A1 | 12/2020 | Wang et al. | |
| 2021/0049265 A1 | 2/2021 | Pescatore et al. | |
| 2021/0065070 A1 | 3/2021 | Augustine et al. | |
| 2021/0065293 A1 | 3/2021 | Sigler et al. | |
| 2021/0090037 A1 | 3/2021 | Dowding | |
| 2021/0099295 A1 | 4/2021 | Li et al. | |
| 2021/0118060 A1 | 4/2021 | Floyd et al. | |
| 2021/0174442 A1 | 6/2021 | Trudeau et al. | |
| 2021/0216525 A1 | 7/2021 | Leise et al. | |
| 2021/0217084 A1 | 7/2021 | Diamond | |
| 2021/0225092 A1 | 7/2021 | Takayama | |
| 2021/0304317 A1 | 9/2021 | Leise et al. | |
| 2021/0326992 A1 | 10/2021 | Leise et al. | |
| 2021/0328804 A1 | 10/2021 | Snow et al. | |
| 2021/0328995 A1 | 10/2021 | Albero et al. | |
| 2021/0342828 A1 | 11/2021 | Magerkurth et al. | |
| 2021/0342946 A1 | 11/2021 | Leise et al. | |
| 2022/0058623 A1 | 2/2022 | Snow et al. | |
| 2022/0058732 A1* | 2/2022 | Reses | G06Q 20/065 |

FOREIGN PATENT DOCUMENTS

| | | |
|---|---|---|
| WO | WO-2018232493 A1 | 12/2018 |
| WO | WO-2021/046494 A1 | 3/2021 |

OTHER PUBLICATIONS

U.S. Appl. No. 17/530,030, Nonfinall Office Action, dated Mar. 2, 2022.
U.S. Appl. No. 17/529,983, Nonfinal Office Action, dated Mar. 4, 2022.
U.S. Appl. No. 17/529,983, Final Office Action, dated Jun. 15, 2022.
U.S. Appl. No. 17/896,617, Non-Final Office Action, dated Jul. 13, 2023.

* cited by examiner

600

| 606 |
|---|
| Transaction ID: unique ID for this transaction |
| Subrogation Demand Contract ID: the ID of the subrogation demand smart contract which this transaction is sending data |
| Originator: identity of entity sending data to the subrogation demand smart contract |
| Counterparty: identity of other party involved in the subrogation demand |
| Smart contract data:<br>+Cryptographic Hash: Cryptographic hash function(demand ID, demand type, subrogation demand amount, party identifiers) |

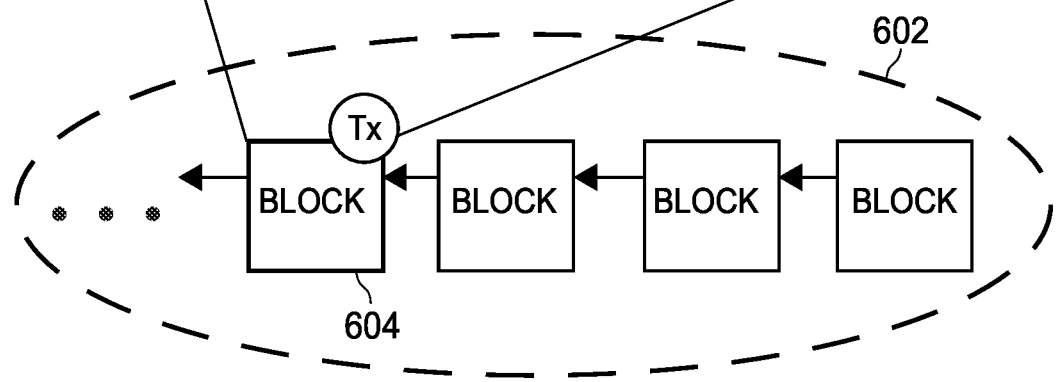

FIG. 6

NET SETTLEMENT OF SUBROGATION CLAIMS USING A DISTRIBUTED LEDGER

CROSS-REFERENCE TO RELATED APPLICATIONS

This application is a continuation of U.S. patent application Ser. No. 17/896,617 entitled "Net Settlement of Subrogation Claims Using a Distributed Ledger," filed on Aug. 26, 2022, which is a continuation of U.S. patent application Ser. No. 17/530,030 entitled "Net Settlement of Subrogation Claims Using a Distributed Ledger," filed on Nov. 18, 2021, which claims priority to and the benefit of the filing date of (1) provisional U.S. Patent Application No. 63/196,516 entitled "Method and System for Verifying Settlement Demands for Subrogation Claims Using a Distributed Ledger," filed on Jun. 3, 2021, and (2) provisional U.S. Patent Application No. 63/196,544 entitled "Net Settlement of Subrogation Claims Using a Distributed Ledger," filed on Jun. 3, 2021, the entire contents of each of which is hereby expressly incorporated herein by reference.

TECHNICAL FIELD

Systems and methods are disclosed with respect to verifying individual subrogation settlements, and verifying a net settlement of a plurality of subrogation settlements using a distributed ledger.

BACKGROUND

When an insured person suffers a covered loss, an insurer may pay costs to the insured person and pursue subrogation from another party involved in the loss. For example, if an insured vehicle is involved in a collision and suffers a loss, the insurer may compensate the vehicle owner according to an insurance agreement. If, for example, the vehicle owner was not at fault in the collision, the insurer may pursue damages from another party, such as the insurer of the party who was at fault in the collision. An insurance agreement may include an obligation of an insured to assign the insured's claim against a party at fault to the insurer, who may then collect on the claim on the insured's behalf.

Conventional systems and techniques for facilitating subrogation claim payments between two insurance companies may have numerous drawbacks. For instance, many unnecessary payments may be made between insurance companies. For example, a payment may be made between insurance companies for each subrogation claim. Thus, if Insurance company A owes Insurance company B $1,000 for a first subrogation claim, and Insurance company B owes Insurance company A $1,000 for a second subrogation claim, two payments may still be made between the insurance companies even though the net transfer of money is zero. This results in a very inefficient system. Conventional systems may have additional drawbacks and inefficiencies, as well, such as payment making or exchange, payment and/or claim status tracking, and timeliness deficiencies.

BRIEF SUMMARY

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

In one aspect, a computer-implemented method for generating a subrogation net settlement smart contract using a distributed ledger may be provided. The method may include, via one or more processors, servers, and/or associated transceivers: (1) generating a subrogation net settlement smart contract configured to: (i) determine a proof of agreement regarding a net settlement including an aggregation of a plurality of settlements between a first party and a second party to a plurality of subrogation claims over a threshold time period by comparing a first cryptographic hash value provided by the first party to a second cryptographic hash value provided by the second party, and determining that there is proof of agreement in response to determining that the first and second cryptographic hash values match, wherein each of the first and second cryptographic hash values are determined based upon one or more characteristics of the net settlement between the first and second parties over the threshold time period; and (ii) transmit notifications to the first and second parties of the proof of agreement regarding the net settlement to allow the first and second parties to verify terms of the net settlement and provide a single payment for each of the plurality of settlements over the threshold time period; and/or (2) deploying the subrogation net settlement smart contract to a distributed ledger maintained by a plurality of participants in a distributed ledger network. The method may include additional, less, or alternate actions, including those discussed elsewhere herein.

In another aspect, a computer-implemented method of verifying a net settlement of a plurality of subrogation claims between a first party and a second party using a distributed ledger may be provided. The method may include, via one or more processors, servers, and/or associated transceivers: (1) determining, by a first party, a net settlement amount including an aggregation of a plurality of settlements between the first party and a second party to a plurality of subrogation claims over a threshold time period; (2) generating a first cryptographic hash value based upon one or more characteristics of the net settlement over the threshold time period between the first party and the second party; (3) broadcasting the first cryptographic hash value to a subrogation net settlement smart contract deployed to a distributed ledger and maintained by a plurality of participants in a distributed ledger network as a proof of agreement of the net settlement between the first and second party, wherein the subrogation demand smart contract compares the first cryptographic hash value submitted by the first party to a second cryptographic hash value submitted by the second party to determine if there is a match; (4) receiving a notification from the subrogation net settlement smart contract that the first and second cryptographic hash values match indicating that there is proof of agreement between the first party and second party; and/or (5) in response to receiving the notification, providing a single payment of the net settlement amount to the second party. The method may include additional, less, or alternate actions, including those discussed elsewhere herein.

In yet another aspect, computer system for verifying a net settlement of a plurality of subrogation claims between a first party and a second party using a distributed ledger may be provided. The computer system may include a network interface, and one or more processors. The computer system may further include a non-transitory computer-readable memory storing instructions thereon, that when executed by the one or more processors, cause the one or more processors to: (1) determine, by a first party, a net settlement amount including an aggregation of a plurality of settlements between the first party and a second party to a plurality of subrogation claims over a threshold time period; (2) generate a first cryptographic hash value based upon one or more characteristics of the net settlement over the threshold time period between the first party and the second party; (3) broadcast, via the network interface, the first cryptographic hash value to a subrogation net settlement smart contract deployed to a distributed ledger and maintained by a plurality of participants in a distributed ledger network as a proof of agreement of the net settlement between the first and second party, wherein the subrogation demand smart contract compares the first cryptographic hash value submitted by the first party to a second cryptographic hash value submitted by the second party to determine if there is a match; (4) receive, via the network interface, a notification from the subrogation net settlement smart contract that the first and second cryptographic hash values match indicating that there is proof of agreement between the first party and second party; and/or (5) in response to receiving the notification, provide a single payment of the net settlement amount to the second party.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein:

FIG. 6 depicts an exemplary transaction in a distributed ledger network for verifying a settlement in a subrogation claim between parties associated with one aspect of the present disclosure.

Figure 1:
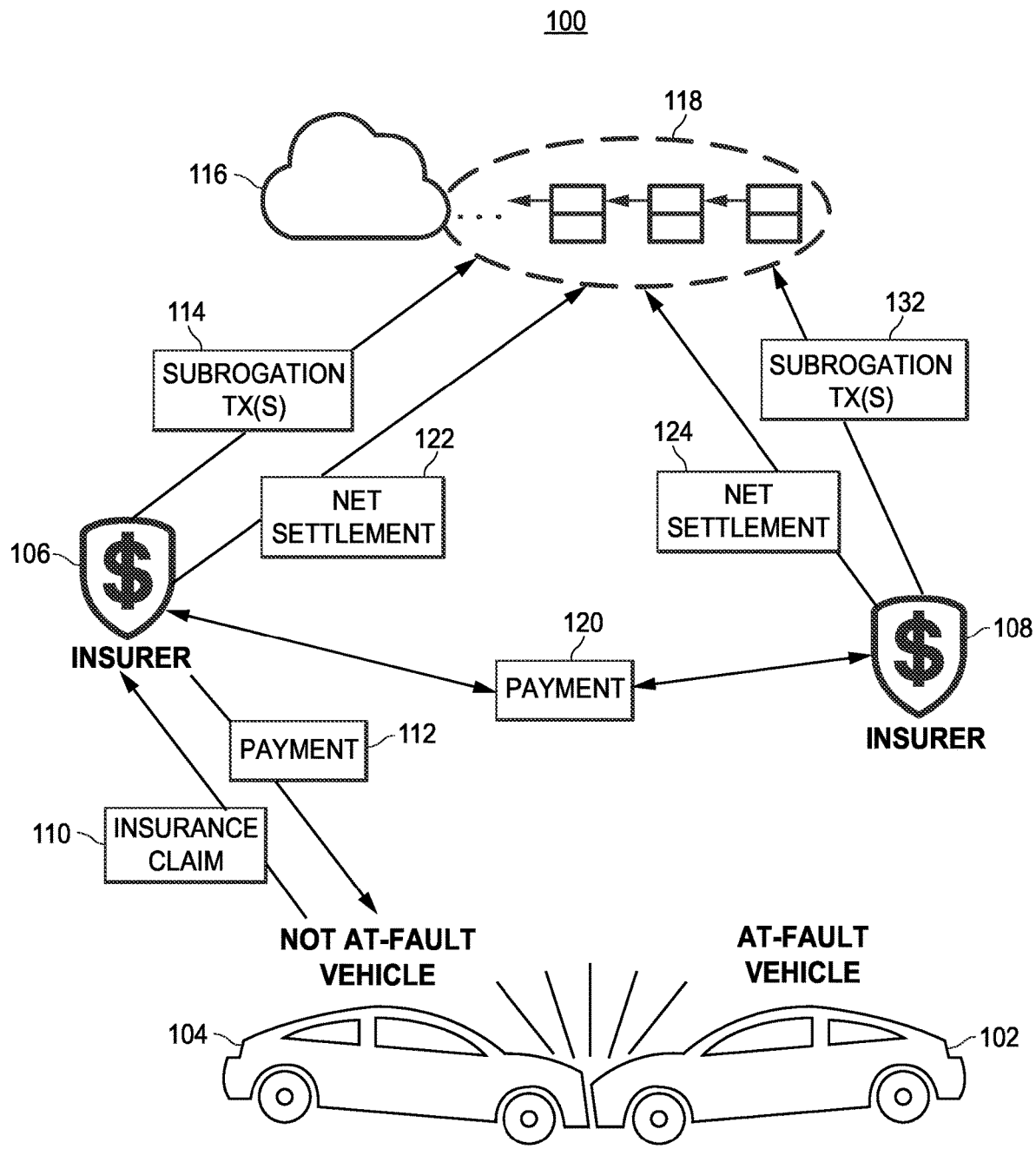
FIG. 1 is a schematic diagram of an exemplary distributed ledger system for verifying settlement demands for subrogation claims and/or for managing net settlement of subrogation claims in accordance with one aspect of the present disclosure.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

A blockchain (also referred to herein as a distributed ledger or a shared ledger) is a way of achieving a distributed consensus on the validity or invalidity of information in the chain. In other words, the blockchain provides a decentralized trust to participants and observers. As opposed to relying on a central authority, a blockchain is a decentralized database in which a transactional record of changes to the ledger is maintained and validated by each node of a peer-to-peer network. The distributed ledger is comprised of groupings of transactions organized together into a "block," and ordered sequentially (thus the term "blockchain"). Nodes may join and leave the blockchain network over time and may obtain blocks that were propagated while the node was gone from peer nodes. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirement and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable. Third party intermediaries who assist in the resolution of subrogation claims may thus be disintermediated from the process by a decentralized blockchain.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

Blockchains may be deployed in a public, decentralized, and permissionless manner meaning that any party may view the shared ledger, submit new information to be added to the ledger, or join the network as a validating node. Other blockchains are private that keep chain data private among a group of entities authorized to participate in the blockchain network. Yet other blockchains are permissioned which may be a hybrid of a public and a private blockchain. In some scenarios, private blockchains are maintained by a single entity, whereas permissioned blockchains include multiple authorized entities to make changes to the blockchain.

The following relates to, inter alia, (i) systems and methods for verifying subrogation settlements, and (ii) systems and methods for verifying a net settlement of a plurality of subrogation settlements.

Exemplary Distributed Ledger for Resolving Subrogation Claims

FIG. 1 depicts an exemplary distributed ledger system 100 for verifying a settlement of a subrogation claim, and/or verifying a net settlement of subrogation claims in accordance with one aspect of the present disclosure. In this regard, when an insured party, such as the owner of not-at-fault vehicle 104 experiences a covered loss, for example in a collision with at-fault vehicle 102, the owner of not-at-fault vehicle 104 may submit an insurance claim 110 to an insurer 106. The insurer 106 may have a contractual obligation to remit a payment 112 to the owner of the not-at-fault vehicle in exchange for assignment of any legal claim the owner of not-at-fault vehicle may have against the owner or operator of at-fault vehicle 102 for damage and expenses associated with the collision.

After insurer 106 has remitted payment 112 to the owner of the not-at-fault vehicle 104 and receive assignment of the vehicle owner's claim against the owner or operator of at-fault vehicle 102, the insurer 106 may initiate a process of managing and resolving the legal claim against the owner or operator of the at-fault vehicle 102 or against an insurer 108 of the at-fault vehicle (e.g., a subrogation claim). In this process, the insurer 106 may receive subrogation payment 120 from the insurer 108.

As will be further described herein, some embodiments provide an improved system to verify the subrogation payment 120. For instance, some embodiments leverage particular technical aspects of distributed ledger technology to provide an improved system to verify the subrogation payment 120. In this regard, and by way of brief overview, the distributed ledger system 100 includes a blockchain 118 accessible by network participants via a network 116 (e.g., a private or public packet switched network). To begin the blockchain subrogation claim resolution process, the insurer 106 broadcasts a subrogation claim or transaction 114 to the blockchain 118.

As described herein, insurer 106 and the insurer 108 may negotiate a settlement of the subrogation claim outside of the blockchain environment or "off-chain." Then both insurers 106, 108 may submit transactions to the blockchain 118 with data indicative of the terms of the settlement agreement. If both transactions include the same data, the insurers 106 and 108 have provided proof that they came to an agreement. In this manner, both parties may verify that their understanding of the settlement is the same. Moreover, by recording the proof of agreement in a distributed ledger, the parties cannot later dispute the terms of the settlement or that they believed the terms to be different.

The blockchain 118 may be a network wherein participating network nodes validate changes to a ledger based upon transactions broadcast by other network participants. The transaction 114 may include information relating to the subrogation claim that may be modified by subsequent transactions broadcast over the network 116. In another implementation, validators on the blockchain 118 are configured to maintain a state database and execute code in smart contracts deployed by network participants. A smart contract on the blockchain 118 may expose methods and maintain the state of data relating to a subrogation claim by the insurer 106 against the insurer 108 relating to an insured loss covered by the insurer 106.

Advantageously, and as will be further explained below, in some embodiments, the payment 120 may be a net settlement payment that aggregates many subrogation payments together. This aggregation reduces the number of payments between insurer 106 and insurer 108, thereby improving efficiency. In this regard, net settlement data 122, 124 may be sent to the blockchain 118 to verify a net settlement payment 120 or other net settlement information.

Figure 2:
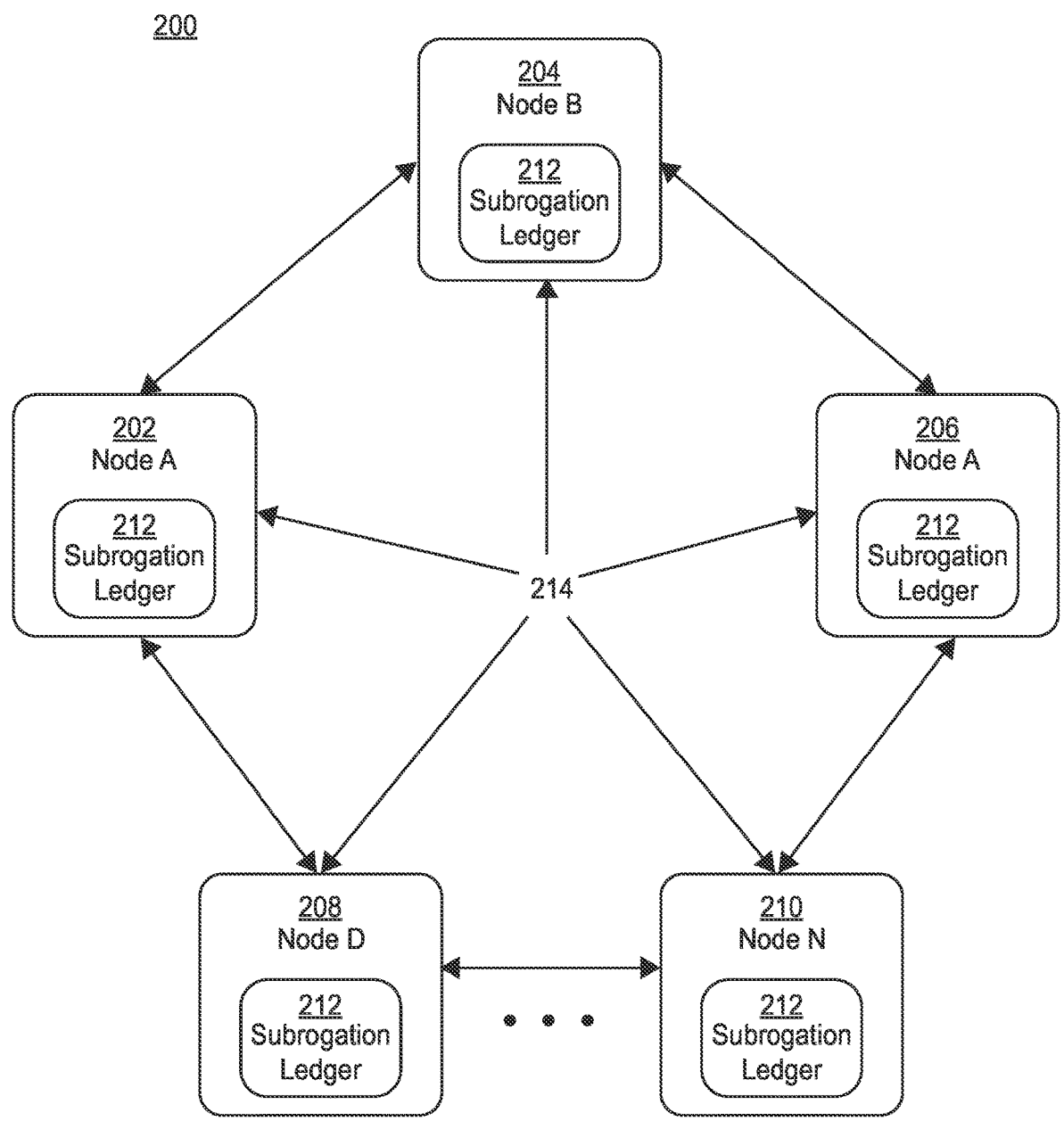
FIG. 2 depicts an exemplary distributed ledger system for verifying settlement demands for subrogation claims and/or for managing net settlement of subrogation claims in accordance with one aspect of the present disclosure.

Exemplary Validating Nodes In A Distributed Ledger System for Resolving Subrogation Claims FIG. 2 depicts an exemplary distributed ledger system 200 for verifying a settlement of a subrogation claim, and/or verifying a net settlement of subrogation claims in accordance with one aspect of the present disclosure. The system 200 includes a distributed subrogation ledger 212 and plurality of nodes 202, 204, 206, 208, and 210. Each node maintains a copy of the subrogation ledger 212. As changes are made to the subrogation ledger 212, each node receiving the change via network 214 updates its respective copy of the distributed subrogation ledger 212. A consensus mechanism may be used by the nodes 202-210 in the distributed ledger system 200 to decide whether it is appropriate to make received changes to the subrogation ledger 212.

Each node in the system therefore has its own copy of the subrogation ledger 212, which is identical to every other copy of the subrogation ledger 212 stored by the other nodes. The distributed ledger system 200 is more robust than a central authority database system because of the distributed ledger's decentralized nature. As such, there is no single point of failure on the distributed ledger system 200 as there would be in a centralized system.

Exemplary Transaction Flow & Block Propagation Flow

Figure 3:
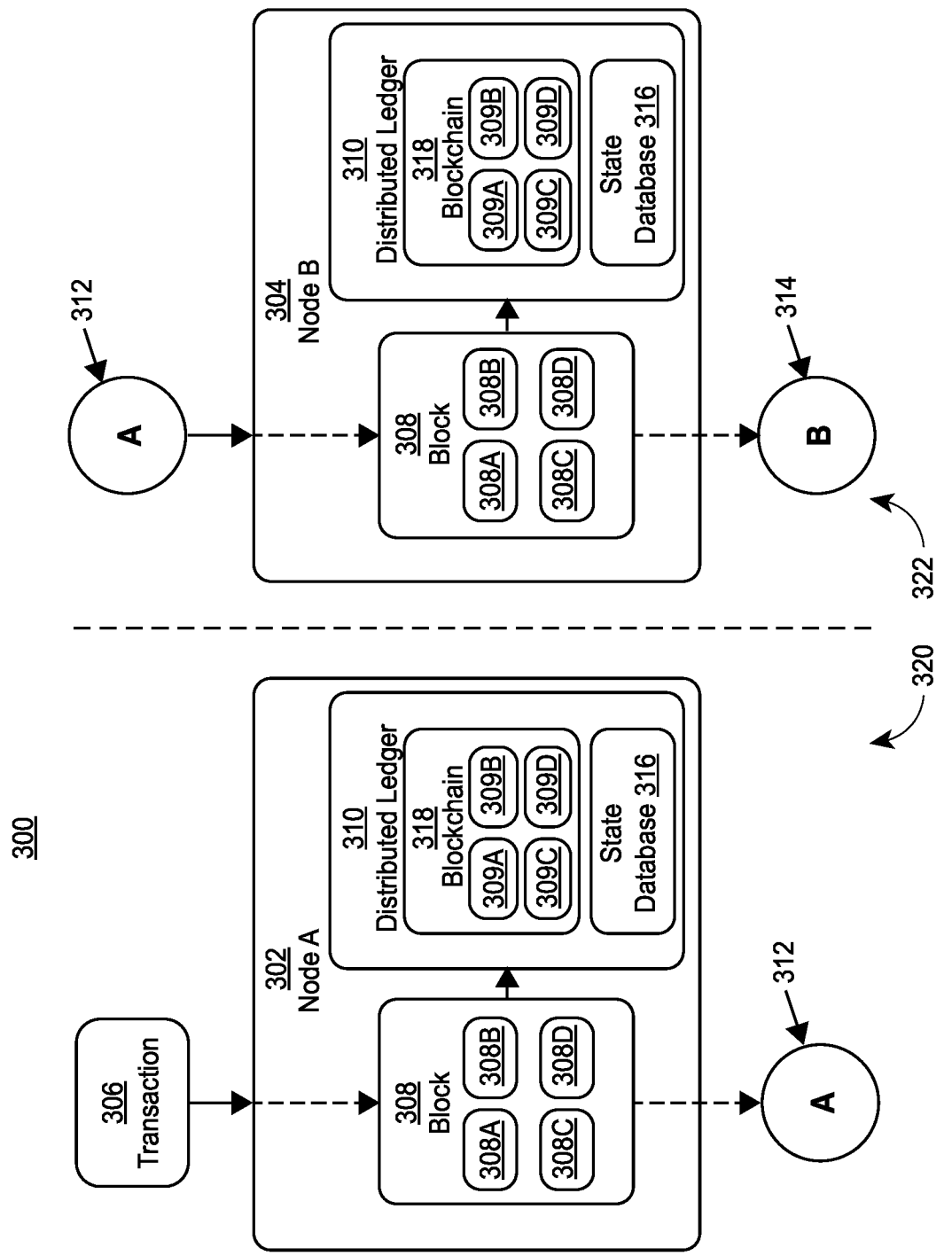
FIG. 3 depicts exemplary validating network nodes and an exemplary transaction flow on a distributed ledger network for verifying settlement demands for subrogation claims and/or for managing net settlement of subrogation claims in accordance with one aspect of the present disclosure.

FIG. 3 depicts exemplary validating network nodes and an exemplary transaction flow 300 on a distributed ledger network for verifying a settlement of a subrogation claim, and/or verifying a net settlement of subrogation claims in accordance with one aspect of the present disclosure. FIG. 3 includes two time frames 320 and 322 represented by the left and right sides of the dotted line, respectively, Node A 302 and Node B 304, a set of transactions 308A-308D, a set of blocks of transactions 309A-309D, a distributed ledger 310, and a blockchain 318.

The block propagation flow 300 may begin with Node A 302 receiving transaction 306 at time 320. When Node A 302 confirms that transaction 306 is valid, the Node A 302 may add the transaction to a newly generated block 308. As part of adding the transaction 306 to block 308, Node A 302 may solve a cryptographic puzzle and include the solution in the newly generated block 308 as proof of the work done to generate the block 308. In other embodiments, the transaction 306 may be added to a pool of transactions until a sufficient number of transactions in the pool exist to form a block. Node A 302 may transmit the newly created block 308 to the network at 312. Before or after propagating the block 308, Node A 302 may add the block 308 to its copy of the blockchain 318.

The transactions 309A-309D may include updates to a state database 316. The state database 316 may contain current values of variables created by smart contracts deployed on the blockchain 318. Validated blocks such as block 308 may include transactions affecting state variables in state database 316. At time 322 Node B 304 may receive the newly created block 308 via the network at 312. Node B 304 may verify that the block of transactions 308 is valid by checking the solution to the cryptographic puzzle provided in the block 308. If the solution is accurate then Node B 304 may add the block 308 to its blockchain 318 and make any updates to the state database 316 as rejected by the transactions in block 308. Node B 304 may then transmit the block 308 to the rest of the network at 314.

Exemplary Node

Figure 4:
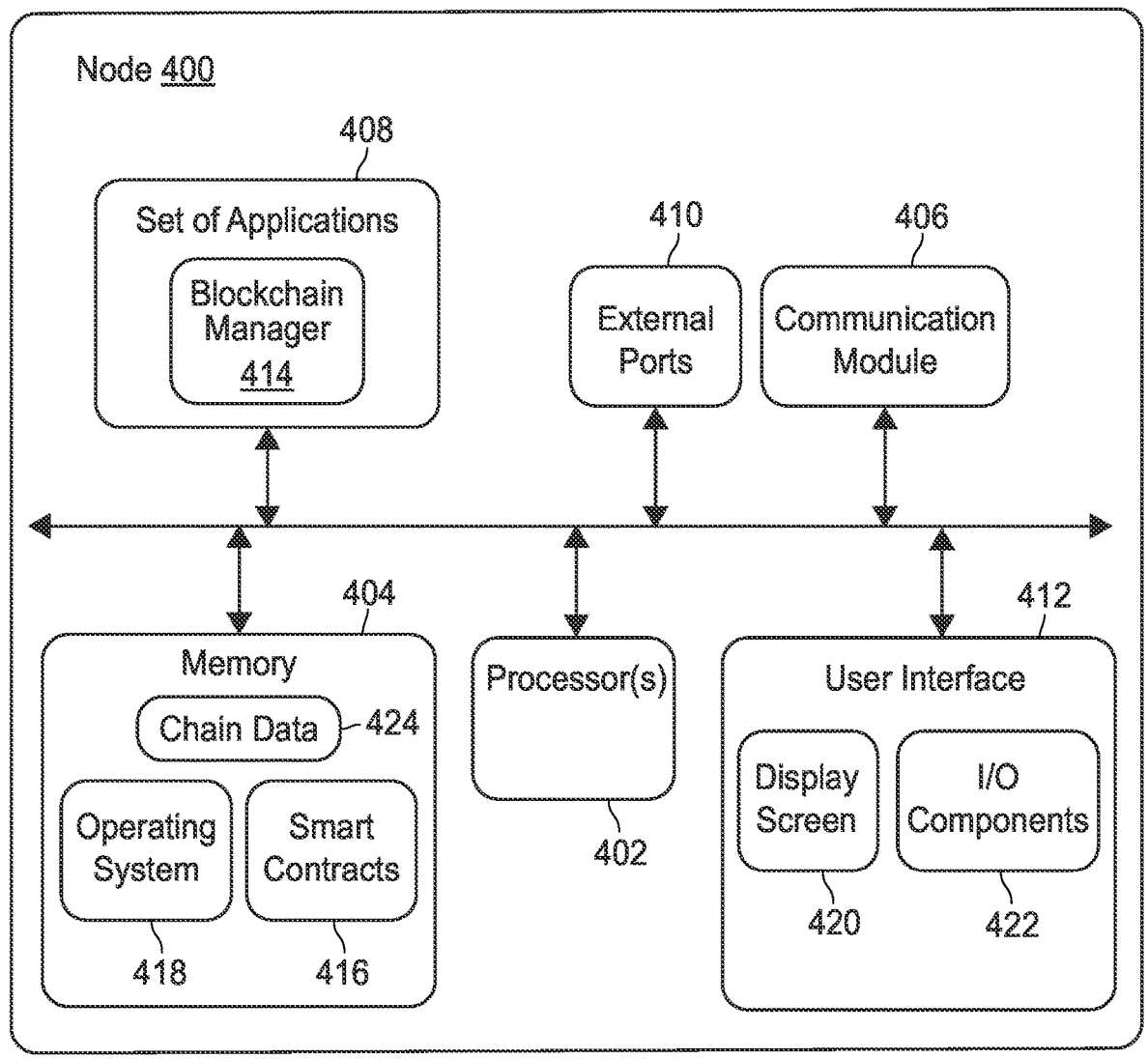
FIG. 4 depicts exemplary components of a network node on a distributed ledger network for verifying settlement demands for subrogation claims and/or for managing net settlement of subrogation claims in accordance with one aspect of the present disclosure.

FIG. 4 depicts exemplary components of a network node 400 on a distributed ledger network for verifying a settlement of a subrogation claim, and/or verifying a net settlement of subrogation claims in accordance with one aspect of the present disclosure. Node 400 is capable of performing the functionality disclosed herein. Node 400 may include at least one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions or may broadcast transactions to other network nodes by using the blockchain manager 414. Similarly, the node 400 may use the blockchain manager 414 in conjunction with the smart contracts 416 stored in memory 404 to execute the functionality disclosed herein. The memory 404 may further include chain data 424 including, for example, a state database of the blockchain for storing state of smart contracts deployed thereon.

In other embodiments, the smart contracts 416 operate independent of the blockchain manager 414 or other applications. In some embodiments, node 400 does not have a blockchain manager 414, or smart contracts 416 stored at the node. In some embodiments, the node 400 may have additional or less components than what is described. The components of the node 400 are described in more detail below.

The node 400, as part of a decentralized ledger system 112, or another decentralized or centralized network, may be used as part of systems that interact with and/or manipulate data and transactions associated with the automotive claims process, the vehicle loss history process, and/or the vehicle identification number lifecycle process.

Exemplary Subrogation Demand Smart Contract State

Figure 5:
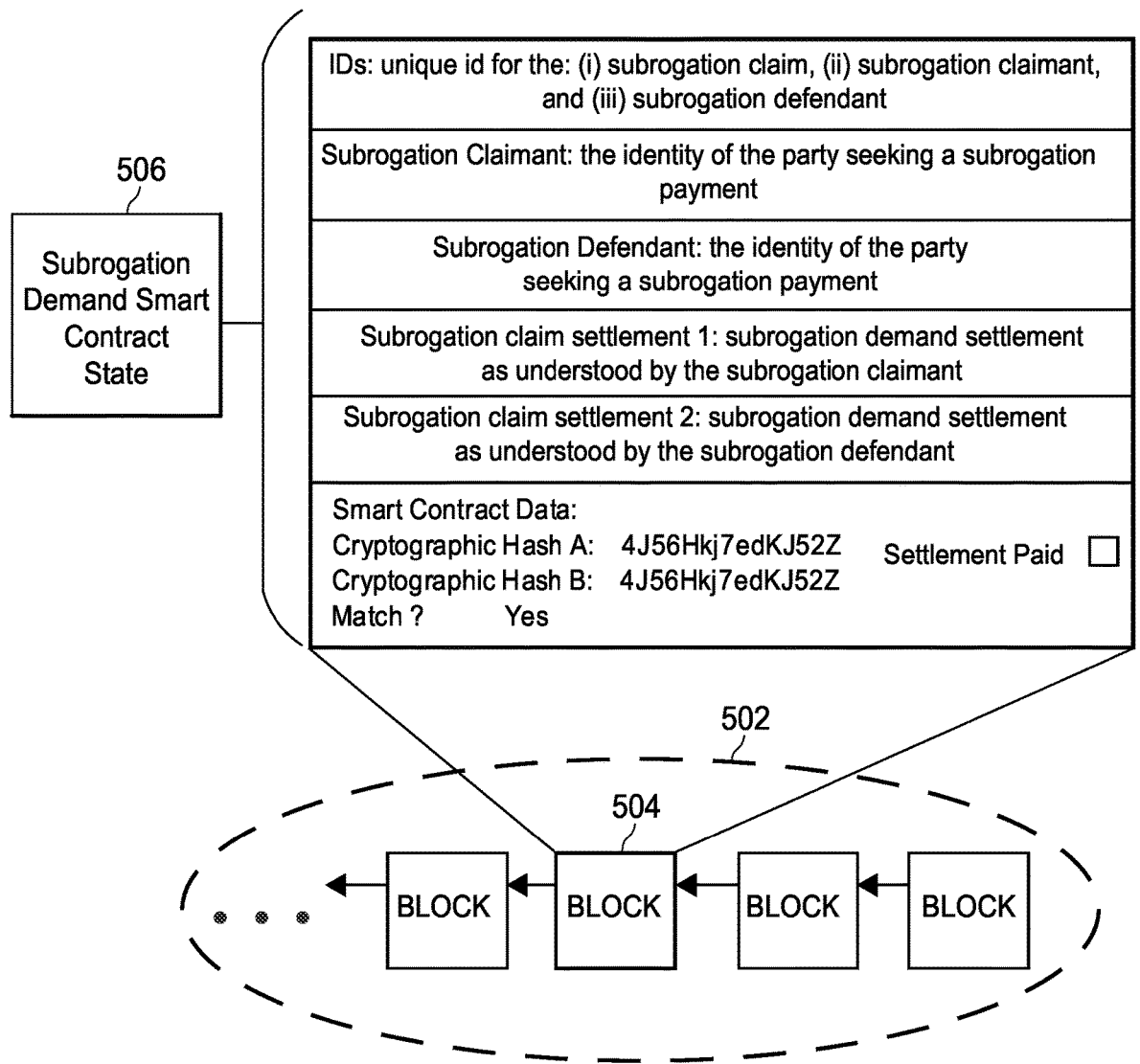
FIG. 5 depicts an exemplary smart contract state in a distributed ledger network for verifying settlements in subrogation claims between parties in accordance with one aspect of the present disclosure.

FIG. 5 depicts an exemplary smart contract state 500 in a distributed ledger network for verifying subrogation demands for subrogation claims between parties in accordance with one aspect of the present disclosure. For instance, in a subrogation claim, Insurer A (e.g., insurer 106) may be a subrogation claimant, and Insurer B (e.g., insurer 108) may be the subrogation defendant. Insurer A and Insurer B may negotiate (e.g., off the distributed ledger) a settlement for the subrogation claim (e.g., based upon crash damage information, the cost of repair or replacement parts due to the crash, police reports, witness testimony, and/or medical records, etc.). For instance, Insurer B may agree to pay Insurer A $1,000 for the subrogation claim. Insurer A may then submit, to a subrogation demand smart contract on the distributed ledger, a cryptographic hash value corresponding to the settlement amount for the subrogation claim. Similarly, Insurer B may also submit, to the subrogation demand smart contract on the distributed ledger, a cryptographic hash value corresponding to the settlement amount for the subrogation claim. If there is a match between the two cryptographic hash values, the subrogation demand smart contract may notify Insurers A and B of the match.

In this manner, the subrogation demand smart contract may verify that both parties agreed to the same terms of the subrogation demand. If there is a disagreement or misunderstanding, the cryptographic hash values submitted by the parties will be different. The subrogation demand smart contract provides proof that both parties agreed to the terms of the subrogation demand at the time they submitted the cryptographic hash values. Furthermore, the subrogation demand smart contract allows the proof of agreement to be recorded in a trusted, secure, and immutable ledger which cannot be altered by one of the parties later on. Therefore, if one of the parties disputes the terms of the subrogation demand at a later date, the other party can use the immutable record in the distributed ledger to show that the party had agreed to the terms of the subrogation demand.

Moreover, by submitting cryptographic hash values that represent the terms of the subrogation demand to the subrogation demand smart contract rather than submitting the terms themselves, the data may be recorded in a public or permissioned ledger. By recording the data in a public or permissioned ledger, the present embodiments prevent centralized control where a single party can unilaterally alter the ledger. The terms of the subrogation demand may include sensitive information that the parties may not want to disclose to the public or to third parties. The cryptographic hash values, on the other hand, are not sensitive, because the cryptographic hashing algorithm used to generate the cryptographic hash values is a one way function which cannot be reversed. Therefore, the cryptographic hash values may be used to prove that both parties agreed to the same terms of the subrogation demand without having to disclose sensitive or private information.

In some implementations, there may be more than two parties to a subrogation claim. In this scenario, each of the parties may submit cryptographic hash values and the subrogation demand smart contract may determine whether each of the cryptographic hash values match.

A smart contract may be deployed by any participant in the subrogation blockchain network to establish a contract state 506 for a particular subrogation demand. The deployed smart contract may expose methods and data to other participants in the subrogation blockchain network. Some of the data in the smart contract state may be private data that may only be altered by calling a method of the smart contract or only altered by authorized blockchain participants.

One way of altering the smart contract state 506 is to broadcast a transaction to the subrogation blockchain 502. If the broadcast transaction satisfies consensus rules, network validators may include the transaction in a block 504. Inclusion in the blockchain 502 of a transaction sending data to the smart contract may cause validating nodes to update a state database, thus allowing network participants access to a rich state mechanism to manage the subrogation process and ultimately to resolve the subrogation claim.

In some implementation, the block of transactions 504 may organize the transactions it has received into a Merkle Tree to facilitate access to the stored transactions. The transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the root of the tree, or the node at the top of the tree, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

The subrogation demand smart contract state 506 may include pieces of data to identify and track the subrogation demand smart contract. For example, a contract owner may select a unique ID for the subrogation smart contract such that subsequent transactions and data sent to the smart contract can identify the contract by ID number. The contract owner may also specify identities of the parties, such as an identifier of the payor party (e.g., subrogation defendant) who owes the subrogation demand settlement amount and an identifier of the payee party (e.g., subrogation claimant) who is owed the subrogation demand settlement amount. In at least one implementation, the payor party and the payee party are identified by cryptographic public keys assigned to the respective entities. Subsequent data sent to the smart contract may include a message signed by private keys corresponding to the public keys identifying the payor party and the payee party in the smart contract, thus providing cryptographic proof that the transaction was originated by one of the parties. The private and public keys may be managed solely by the parties to minimize the attack surface for any attackers that might attempt to forge a transaction (e.g., the parties generate public/private cryptographic key pairs offline and only provide the public key to other network participants). A party's private keys may be generated according to a securely stored seed value (e.g., on a piece of physical paper or multiple copies of a piece of paper) such that the private keys may be recovered in the case of a data loss.

The subrogation demand smart contract state 506 may further include data representing the agreed upon subrogation demand settlement as understood by each of the parties to the subrogation demand settlement. More specifically, the smart contract state 506 may include a first set of data representing the agreed upon subrogation claim settlement as understood by the payor party. The subrogation demand settlement smart contract state 506 may also include a second set of data representing the agreed upon subrogation settlement as understood by the payee party. Each of the sets of data may include the same terms (also referred to herein as "characteristics") of the subrogation settlement. For example, the first set of data may include an identifier of the subrogation settlement demand, the subrogation settlement amount as understood by the payor party, a party identifier of the payor party such as a company code, a party identifier of the payee party such as a company code, and/or a demand type (e.g., original or supplemental). In other implementations, the first set of data may additionally or alternatively include evidence data relevant to the subrogation claim (e.g., crash damage information, police reports, witness testimony, the cost of repair or replacement parts due to the crash, and/or medical records, etc.). The second set of data may include the identifier of the subrogation settlement demand, the subrogation demand settlement amount as understood by the payee party, a party identifier of the payor party such as a company code, a party identifier of the payee party such as a company code, and/or a demand type (e.g., original or supplemental). In other implementations, the first set of data may additionally or alternatively include evidence data relevant to the subrogation claim (e.g., crash damage information, the cost of repair or replacement parts due to the crash, police reports, witness testimony, and/or medical records, etc.).

In some implementations, the first set of data is hashed according to a cryptographic hashing algorithm (e.g., SHA- 256) and the resulting output hash (a first cryptographic hash value) is included in a transaction in a block that has been accepted by the network nodes as satisfying the consensus rules of the blockchain. The second set of data is also hashed according to the same cryptographic hashing algorithm (e.g., SHA-256) and the resulting output hash (a second cryptographic hash value) is also included in a transaction in a block that has been accepted by the network nodes as satisfying the consensus rules of the blockchain.

Because the same cryptographic hashing algorithm is applied to sets of data from each of the parties which include the same sets of characteristics of the subrogation demand settlement, the subrogation demand settlement smart contract may determine whether the subrogation demand settlement amount and other characteristics of the subrogation demand settlement submitted by both parties is the same by comparing the cryptographic hash values submitted by the payor party and the payee party. As a result, the payor party submits the first cryptographic hash value to the subrogation demand settlement smart contract and the payee party submits the second cryptographic hash value to the subrogation demand settlement smart contract as proof of agreement of the subrogation demand settlement amount owed between the parties.

The subrogation demand settlement smart contract compares the first and second cryptographic hash values and, if they are the same, the subrogation demand settlement smart contract determines there is proof of agreement between the parties. In response to this determination, the subrogation demand settlement smart contract transmits notifications to each of the parties indicating that the cryptographic hash values match verifying that each of the parties agrees to the terms of the subrogation demand settlement, thereby causing the payor party to pay the subrogation demand settlement amount to the payee party. In this manner, a robust and indisputable record of the subrogation claim agreement is created. In other implementations, in response to receiving notifications that the cryptographic hash values match, both of the parties may append the settlement to a list or set of settlements between the parties which were agreed upon over a threshold time period (e.g., a day, a week, a month, etc.). In this manner, both parties may determine a net settlement amount with each other over the threshold time period. For example, both parties may maintain a list of each of the settlements agreed upon with each other during a particular day. At the end of the day, both parties may aggregate the settlement amounts for the settlements that occurred during the day to determine the net settlement amount between the parties. This facilitates one payment between the parties each day (representing the net settlement amount between the parties), instead of each party sending numerous payments (each associated with an individual insured, insurance claim, and/or individual settlement amount associated with an insurance-related event (such as a vehicle accident)) to the other party each day.

In some implementations, the subrogation demand settlement smart contract holds and releases a bond or a settlement payment based upon a depositing transaction that turns over control of a token having value that circulates on the blockchain 502. The token may be the unit of payment for validating nodes on the network of the blockchain 502 (e.g., the validating nodes are executing smart contract code deployed by other network participants and are paid in a token). Alternatively, or additionally, the token may be a token itself issued by a smart contract and circulating on top of a base blockchain (e.g., a blockchain providing a virtual machine platform for smart contract execution). The value of the token may be free-floating against other crypto-tokens and/or fiat currencies against which it may be traded or the token may be a "stablecoin" pegged to a reference value (e.g., pegged to the U.S. Dollar, the Euro, the Yen, an ounce of gold, etc.). The subrogation demand settlement smart contract may be programmed to receive tokens from the payor party and release a token amount to the payee party having a value corresponding to the subrogation demand settlement amount in response to determining there is proof of agreement between the parties.

On the other hand, if the first and second cryptographic hash values are not the same, the subrogation demand settlement smart contract determines there is no agreement between the parties. In response to this determination, the subrogation demand settlement smart contract transmits notifications to each of the parties indicating that there is no agreement regarding the subrogation demand settlement. The parties may then determine the reason for the mismatch off-chain. For example, one of the parties may have mistakenly identified the wrong settlement amount.

Another aspect of the subrogation smart contract state 506 associated with a subrogation demand settlement is the smart contract data. Smart contract data may be thought of like the private and public data in an object created according to an object-oriented programming paradigm in that they may be directly updated from outside the object or they may be updated only in limited ways, such as by calling a method of the smart contract. In at least one implementation, smart contract data includes the first and second cryptographic hash values. The smart contract data may also include an indication of whether the first and second cryptographic hash values match.

Furthermore, the smart contract data may include an indication (e.g., a flag) as to whether the payor party has paid the subrogation demand settlement amount to the payee party when the first and second cryptographic hash values match. These flags may be set according to methods in the smart contract that require the caller to prove its identity. The method may only permit, for example, the payor party to set a flag indicating that the payor party has paid the payee party. In other implementations, the method may only permit, for example, the payee party to set a flag indicating that the payee party has received the subrogation demand settlement amount from the payor party.

In addition, in some embodiments, the parties may negotiate both an original subrogation demand and a supplemental subrogation demand. Supplemental subrogation demands generally may happen in two circumstances. The first is when additional expenses/items are submitted after the original subrogation demand. The second is when some (but not all) of the expenses/items are agreed on by the parties. The agreed on expenses/items are passed through the blockchain (e.g., hash values are submitted to the subrogation demand smart contract), while the expenses/items that are not agreed on are further negotiated, and later passed through the blockchain as a supplemental demand.

To further illustrate, as described above, first and second cryptographic hash values may be submitted to the subrogation demand smart contract for the original subrogation demand. Subsequently, for a supplemental subrogation demand, the parties may submit, to the subrogation demand smart contract, third and fourth cryptographic hash values. A match between the third and fourth cryptographic hash values indicates that there is a proof of agreement for the supplemental subrogation demand.

In yet other implementations, the smart contract data does not include an indication as to whether the payor party has paid the subrogation demand settlement amount to the payee party. Instead, in response to making the payment of the subrogation demand settlement amount to the payee party, the payor party submits a transaction to a subrogation payment smart contract which includes the payment information to provide proof of the payment, as described in more detail below.

Exemplary Subrogation Demand Transaction

In some embodiments, after the subrogation claimant and subrogation defendant have agreed to a subrogation demand settlement amount off-chain, a party may then generate and broadcast a transaction to the distributed ledger network including the characteristics of the subrogation demand settlement and/or a cryptographic hash value determined based upon the characteristics of the subrogation demand settlement. In other implementations, an aggregator or managed service provider may generate and broadcast transactions on behalf of one or more of the parties.

FIG. 6 depicts an exemplary transaction 600 on a distributed ledger network for verifying a subrogation settlement demand between parties in accordance with one aspect of the present disclosure. The transaction 600 may send data to a smart contract deployed on the blockchain 602, such as the subrogation demand settlement smart contract as shown in FIG. 5. An originator of the transaction 600 may broadcast the transaction to nodes on the blockchain network and the transaction 600 will be included in block 604 if it is a valid transaction. The transaction 600 may include various information 606 regarding the transaction's changes to the subrogation demand smart contract state managed by the blockchain 602. For example, the transaction 600 may include the unique subrogation demand contract ID, the originator of the transaction which may be the payor party or the payee party to the subrogation demand settlement, the counterparty which may be the other party to the subrogation demand settlement, and data regarding characteristics of the subrogation demand settlement between the parties. The characteristics may include an identifier of the subrogation settlement demand, the subrogation demand settlement amount, an identifier of the payor party such as a company code, an identifier of the payee party such as a company code, and demand type (e.g., original or supplemental). In some implementations, the data regarding the subrogation demand settlement may be a cryptographic hash value calculated by applying a cryptographic hashing algorithm (e.g., SHA-256) to the characteristics of the subrogation demand settlement.

Furthermore, when the subrogation demand settlement smart contract determines that the cryptographic hash values match, the parties may append the settlement amount to a set of settlement amounts between the first party and the second party agreed upon over a threshold time period to determine a net settlement amount between the parties over the threshold time period. In this regard, both the original subrogation demand amount and the supplemental subrogation demand amounts may be appended to the set of settlement amounts to determine the net settlement amount.

Exemplary Subrogation Net Settlement Smart Contract State

Figure 7:
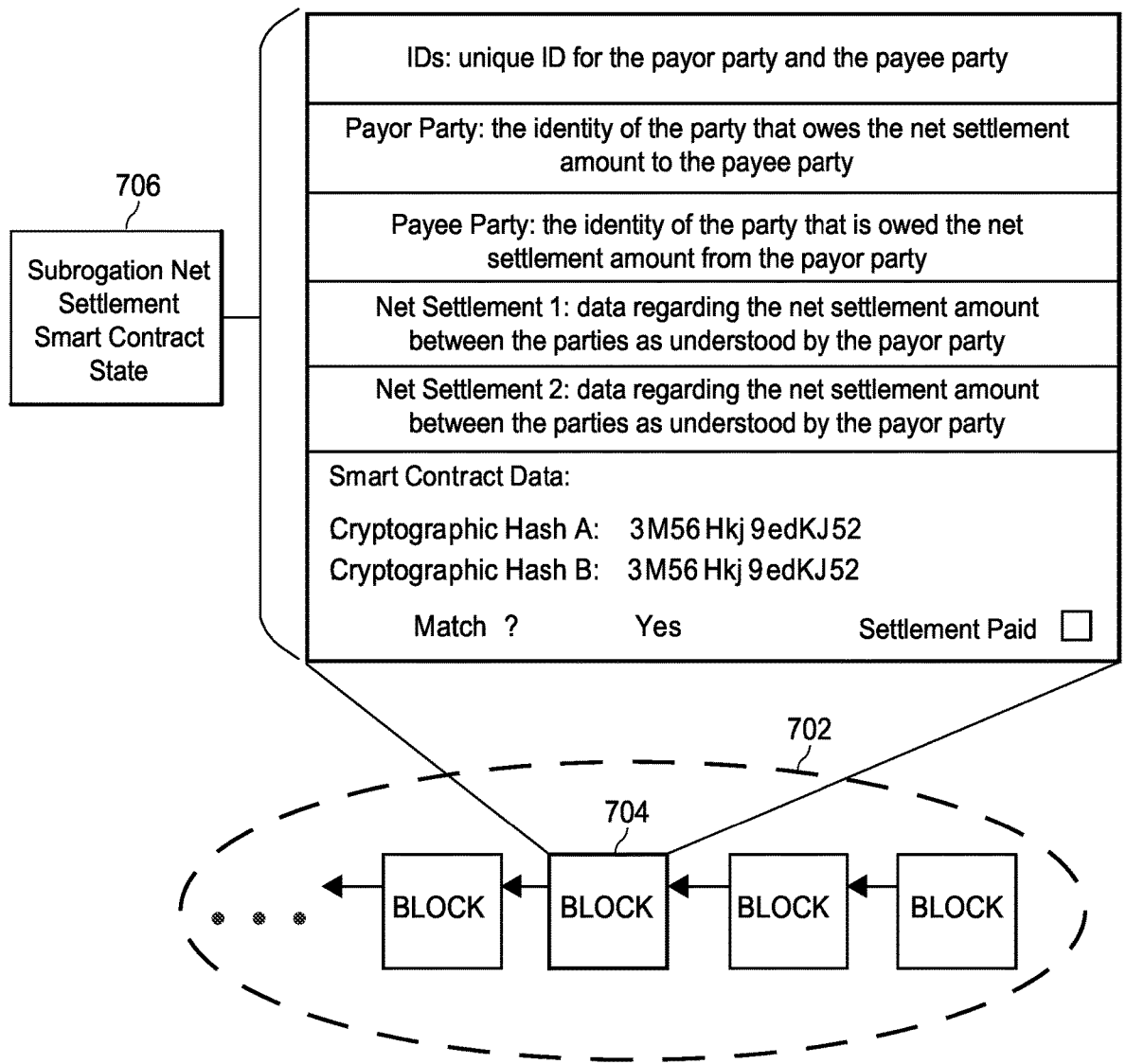
FIG. 7 depicts an exemplary smart contract state in a distributed ledger network for resolving net settlements in subrogation claims between parties over a threshold time period in accordance with one aspect of the present disclosure.

FIG. 7 depicts an exemplary smart contract state 700 in a distributed ledger network for resolving multiple subrogation claims between parties in accordance with one aspect of the present disclosure. As described above, a party to several subrogation claims which were settled with another party may aggregate each of the settlement amounts agreed upon over a threshold time period (e.g., a day, a week, a month, etc.). The party may then determine the net settlement amount that is owed to or owed by the other party over the threshold time period. Then the party may submit an indication of the net settlement amount (e.g., a cryptographic hash value representative of the net settlement amount) to a subrogation net settlement smart contract as proof of agreement between the parties of the net settlement amount that is owed to or owed by the other party. For example, over the course of a day, Insurer A may agree to three subrogation settlements with Insurer B resulting in a net settlement amount where Insurer A owes Insurer B $500. During the same day, Insurer A may agree to five subrogation settlements with Insurer C resulting in a net settlement amount where Insurer C owes Insurer A $3,000. Accordingly, Insurer A may submit a cryptographic hash value representative of the net settlement amount between Insurer A and Insurer B to a subrogation net settlement smart contract. Insurer A may also submit a cryptographic hash value representative of the net settlement amount between Insurer A and Insurer C to a subrogation net settlement smart contract. The subrogation net settlement smart contracts may be the same subrogation net settlement smart contract or separate subrogation net settlement smart contracts for each pair of parties.

In this manner, the subrogation net settlement smart contract may verify that both parties agreed to the same terms of the net settlement. If there is a disagreement or misunderstanding, the cryptographic hash values submitted by the parties will be different. The subrogation net settlement smart contract provides proof that both parties agreed to the terms of the net settlement at the time they submitted the cryptographic hash values. Furthermore, the subrogation net settlement smart contract allows the proof of agreement to be recorded in a trusted, secure, and immutable ledger which cannot be altered by one of the parties later on. Therefore, if one of the parties disputes the terms of the net settlement at a later date, the other party can use the immutable record in the distributed ledger to show that the party had agreed to the terms of the net settlement.

Moreover, by submitting cryptographic hash values that represent the terms of the net settlement to the subrogation net settlement smart contract rather than submitting the terms themselves, the data may be recorded in a public or permissioned ledger. By being able to record the data in a public or permissioned ledger, the present embodiments prevent centralized control where a single party can unilaterally alter the ledger. The terms of the net settlement may include sensitive information that the parties may not want to disclose to the public or to third parties. The cryptographic hash values, on the other hand, are not sensitive, because the cryptographic hashing algorithm used to generate the cryptographic hash values is a one way function which cannot be reversed. Therefore, the cryptographic hash values may be used to prove that both parties agreed to the same terms of the net settlement without having to disclose sensitive or private information.

A smart contract may be deployed by any participant in the subrogation blockchain network (e.g., a party to several subrogation claims) to establish a contract state 706 for a particular net settlement. The deployed smart contract may expose methods and data to other participants in the subrogation blockchain network. Some of the data in the smart contract state may be private data that may only be altered by calling a method of the smart contract or only altered by authorized blockchain participants.

One way of altering the smart contract state 706 is to broadcast a transaction to the subrogation blockchain 702. If the broadcast transaction satisfies consensus rules, network validators may include the transaction in a block 704. Inclusion in the blockchain 702 of a transaction sending data to the smart contract may cause validating nodes to update a state database, thus allowing network participants access to a rich state mechanism to manage the subrogation process and ultimately to resolve the subrogation claim.

In some implementation, the block of transactions 704 may organize the transactions it has received into a Merkle Tree to facilitate access to the stored transactions. The transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the root of the tree, or the node at the top of the tree, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

The subrogation net settlement smart contract state 706 may include pieces of data to identify and track the subrogation smart contract. For example, a contract owner may select a unique ID for the subrogation smart contract such that subsequent transactions and data sent to the smart contract can identify the contract by ID number. The contract owner may also specify identities of the parties, such as an identifier of the payor party who owes the net settlement amount and an identifier of the payee party who is owed the net settlement amount. In at least one implementation, the payor party and the payee party are identified by cryptographic public keys assigned to the respective entities. Subsequent data sent to the smart contract may include a message signed by private keys corresponding to the public keys identifying the payor party and the payee party in the smart contract, thus providing cryptographic proof that the transaction was originated by one of the parties. The private and public keys may be managed solely by the parties to minimize the attack surface for any attackers that might attempt to forge a transaction (e.g., the parties generate public/private cryptographic key pairs offline and only provide the public key to other network participants). A party's private keys may be generated according to a securely stored seed value (e.g., on a piece of physical paper or multiple copies of a piece of paper) such that the private keys may be recovered in the case of a data loss.

The subrogation net settlement smart contract state 706 may further include data representing the agreed upon net settlement as understood by each of the parties to the net settlement. More specifically, the smart contract state 706 may include a first set of data representing the agreed upon net settlement as understood by the payor party. The subrogation net settlement smart contract state 706 may also include a second set of data representing the agreed upon net settlement as understood by the payee party. Each of the sets of data may include the same terms (also referred to herein as "characteristics") of the net settlement. For example, the first set of data may include the net settlement amount as understood by the payor party, a party identifier of the payor party such as a company code, a party identifier of the payee party such as a company code, and data representative of each of the settlement demands agreed upon by the parties over the threshold time period (e.g., cryptographic hash values for each of the settlement demands agreed upon by the parties over the threshold time period). The second set of data may include the net settlement amount as understood by the payee party, a party identifier of the payor party such as a company code, a party identifier of the payee party such as a company code, and data representative of each of the settlement demands agreed upon by the parties over the threshold time period (e.g., cryptographic hash values for each of the settlement demands agreed upon by the parties over the threshold time period).

In some implementations, the first set of data is hashed according to a cryptographic hashing algorithm (e.g., SHA-256) and the resulting output hash (a first cryptographic hash value) is included in a transaction in a block that has been accepted by the network nodes as satisfying the consensus rules of the blockchain. The second set of data is also hashed according to the same cryptographic hashing algorithm (e.g., SHA-256) and the resulting output hash (a second cryptographic hash value) is also included in a transaction in a block that has been accepted by the network nodes as satisfying the consensus rules of the blockchain.

Because the same cryptographic hashing algorithm is applied to sets of data from each of the parties which include the same sets of characteristics of the net settlement, the subrogation net settlement smart contract may determine whether the net settlement amount and other characteristics of the net settlement submitted by both parties is the same by comparing the cryptographic hash values submitted by the payor party and the payee party. As a result, the payor party submits the first cryptographic hash value to the subrogation net settlement smart contract and the payee party submits the second cryptographic hash value to the subrogation net settlement smart contract as proof of agreement of the net settlement amount owed between the parties.

The subrogation net settlement smart contract compares the first and second cryptographic hash values and if they are the same, the subrogation net settlement smart contract determines there is proof of agreement between the parties. In response to this determination, the subrogation net settlement smart contract transmits notifications to each of the parties indicating that the cryptographic hash values match verifying that each of the parties agrees to the terms of the net settlement, thereby causing the payor party to pay the net settlement amount to the payee party. In this manner, the payor party provides a single payment for each of the subrogation settlements between the parties over the threshold time period. This significantly reduces the number of transactions between the parties, which reduces transaction costs and saves bandwidth by decreasing the number of transactions over the network.

In some implementations, the subrogation net settlement smart contract holds and releases a bond or a settlement payment based upon a depositing transaction that turns over control of a token having value that circulates on the blockchain 702. The token may be the unit of payment for validating nodes on the network of the blockchain 702 (e.g., the validating nodes are executing smart contract code deployed by other network participants and are paid in a token). Alternatively, or additionally, the token may be a token itself issued by a smart contract and circulating on top of a base blockchain (e.g., a blockchain providing a virtual machine platform for smart contract execution). The value of the token may be free-floating against other crypto-tokens and/or fiat currencies against which it may be traded or the token may be a "stablecoin" pegged to a reference value (e.g., pegged to the U.S. Dollar, the Euro, the Yen, an ounce of gold, etc.). The subrogation net settlement smart contract may be programmed to receive tokens from the payor party and release a token amount to the payee party having a value corresponding to the net settlement amount in response to determining there is proof of agreement between the parties.

On the other hand, if the first and second cryptographic hash values are not the same, the subrogation net settlement smart contract determines there is no agreement between the parties. In response to this determination, the subrogation net settlement smart contract transmits notifications to each of the parties indicating that there is no agreement regarding the net settlement. The parties may then determine the reason for the mismatch off-chain. For example, one of the parties may have mistakenly included a settlement in the net settlement that was not agreed upon.

Another aspect of the subrogation smart contract state 706 associated with a subrogation net settlement is the smart contract data. Smart contract data may be thought of like the private and public data in an object created according to an object-oriented programming paradigm in that they may be directly updated from outside the object or they may be updated only in limited ways, such as by calling a method of the smart contract. In at least one implementation, smart contract data includes the first and second cryptographic hash values. The smart contract data may also include an indication of whether the first and second cryptographic hash values match.

Furthermore, the smart contract data may include an indication (e.g., a flag) as to whether the payor party has paid the net settlement amount to the payee party when the first and second cryptographic hash values match. These flags may be set according to methods in the smart contract that require the caller to prove its identity. The method may only permit, for example, the payor party to set a flag indicating that the payor party has paid the payee party. In other implementations, the method may only permit, for example, the payee party to set a flag indicating that the payee party has received the net settlement amount from the payor party.

In yet other implementations, the smart contract data does not include an indication as to whether the payor party has paid the net settlement amount to the payee party. Instead, in response to making the payment of the net settlement amount to the payee party, the payor party submits a transaction to a subrogation payment smart contract which includes the payment information to provide proof of the payment, as described in more detail below.

Exemplary Subrogation Net Settlement Transaction

After a threshold time period has expired, a party may aggregate each of the settlements which were agreed upon with a counterparty over the threshold time period to generate the net settlement. For example, the party may compile a set of settlements with the counterparty over the threshold time period where each settlement was verified via the subrogation demand smart contract. The party may then aggregate the settlement amounts for the set of settlements to determine the net settlement amount owed to/by the counterparty. If the aggregate of the settlement amounts is positive, the party may determine that they owe the counterparty the net settlement amount. If the aggregate of the settlement amounts is negative, the party may determine that the counterparty owes the net settlement amount. In any event, the party may then generate and broadcast a transaction to the distributed ledger network including the characteristics of the net settlement and/or a cryptographic hash value determined based upon the characteristics of the net settlement. In other implementations, an aggregator or managed service provider may generate and broadcast transactions on behalf of one or more of the parties.

Figure 8:
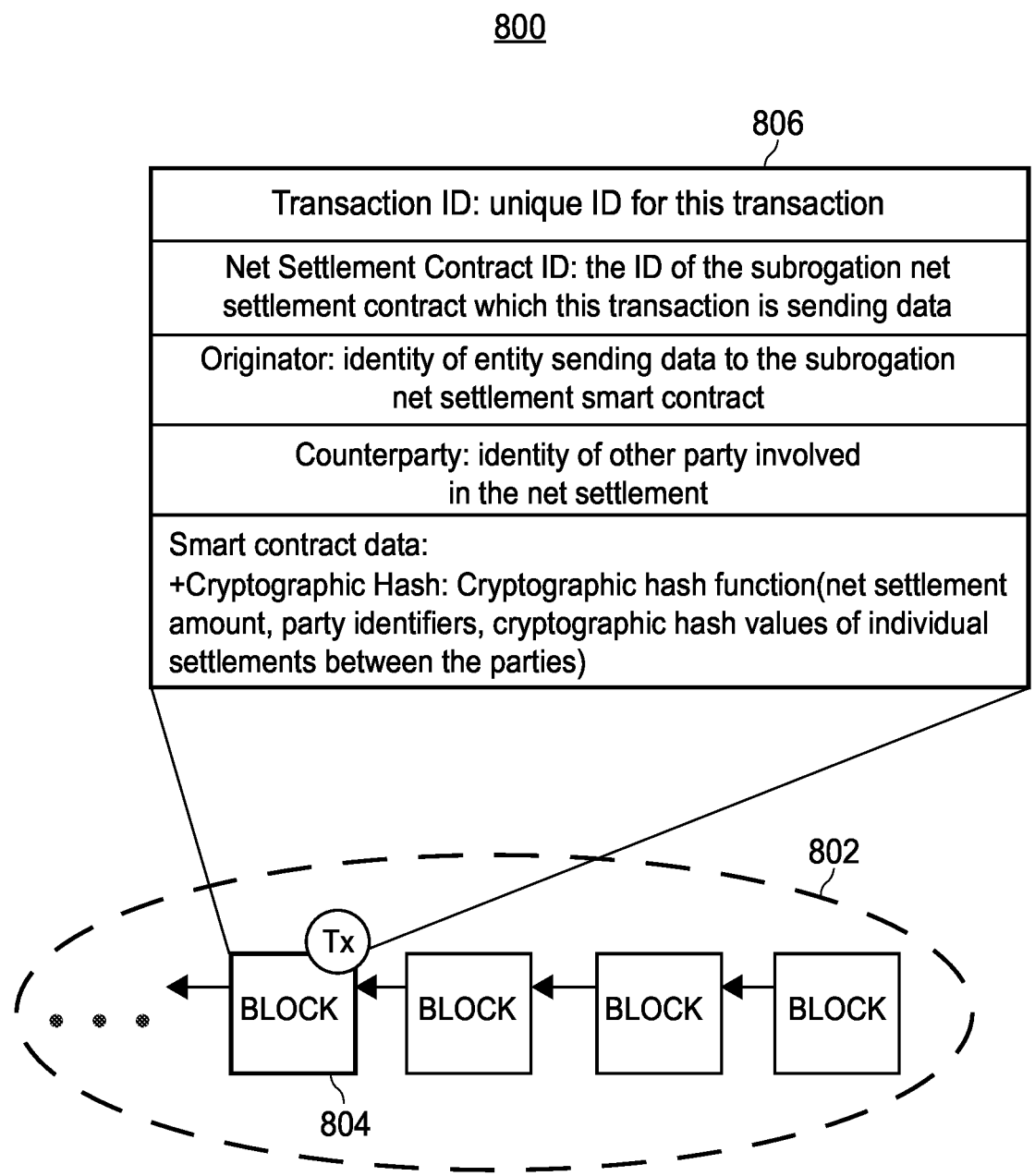
FIG. 8 depicts an exemplary transaction in a distributed ledger network for resolving net settlement in subrogation claims between parties over a threshold time period associated with one aspect of the present disclosure.

FIG. 8 depicts an exemplary transaction 800 on a distributed ledger network for resolving multiple subrogation claims between parties in accordance with one aspect of the present disclosure. The transaction 800 may send data to a smart contract deployed on the blockchain 802, such as the subrogation net settlement smart contract as shown in FIG. 7. An originator of the transaction 800 may broadcast the transaction to nodes on the blockchain network and the transaction 800 will be included in block 804 if it is a valid transaction. The transaction 800 may include various information 806 regarding the transaction's changes to the subrogation net settlement smart contract state managed by the blockchain 802. For example, the transaction 800 may include the unique subrogation net settlement contract ID, the originator of the transaction which may be the payor party or the payee party to the subrogation net settlement, the counterparty which may be the other party to the subrogation net settlement, and data regarding characteristics of the net settlement between the parties over a threshold time period. The characteristics may include the net settlement amount, an identifier of the payor party such as a company code, an identifier of the payee party such as a company code, and data representative of each of the individual settlements between the parties over the threshold time period (e.g., cryptographic hash values for each of the individual settlements). In some implementations, the data regarding the net settlement may be a cryptographic hash value calculated by applying a cryptographic hashing algorithm (e.g., SHA-256) to the characteristics of the net settlement.

Exemplary Subrogation Payment Smart Contract State

In some implementations, in response to the payor party receiving a notification from the subrogation net settlement smart contract that there is proof of agreement of the net settlement between the parties, the payor party may submit payment to the payee party for example, via an electronic funds transfer (EFT). The payor party may then generate and transmit a transaction to a subrogation payment smart contract which includes the payment information as proof that that payment for the net settlement has been made.

Figure 9:
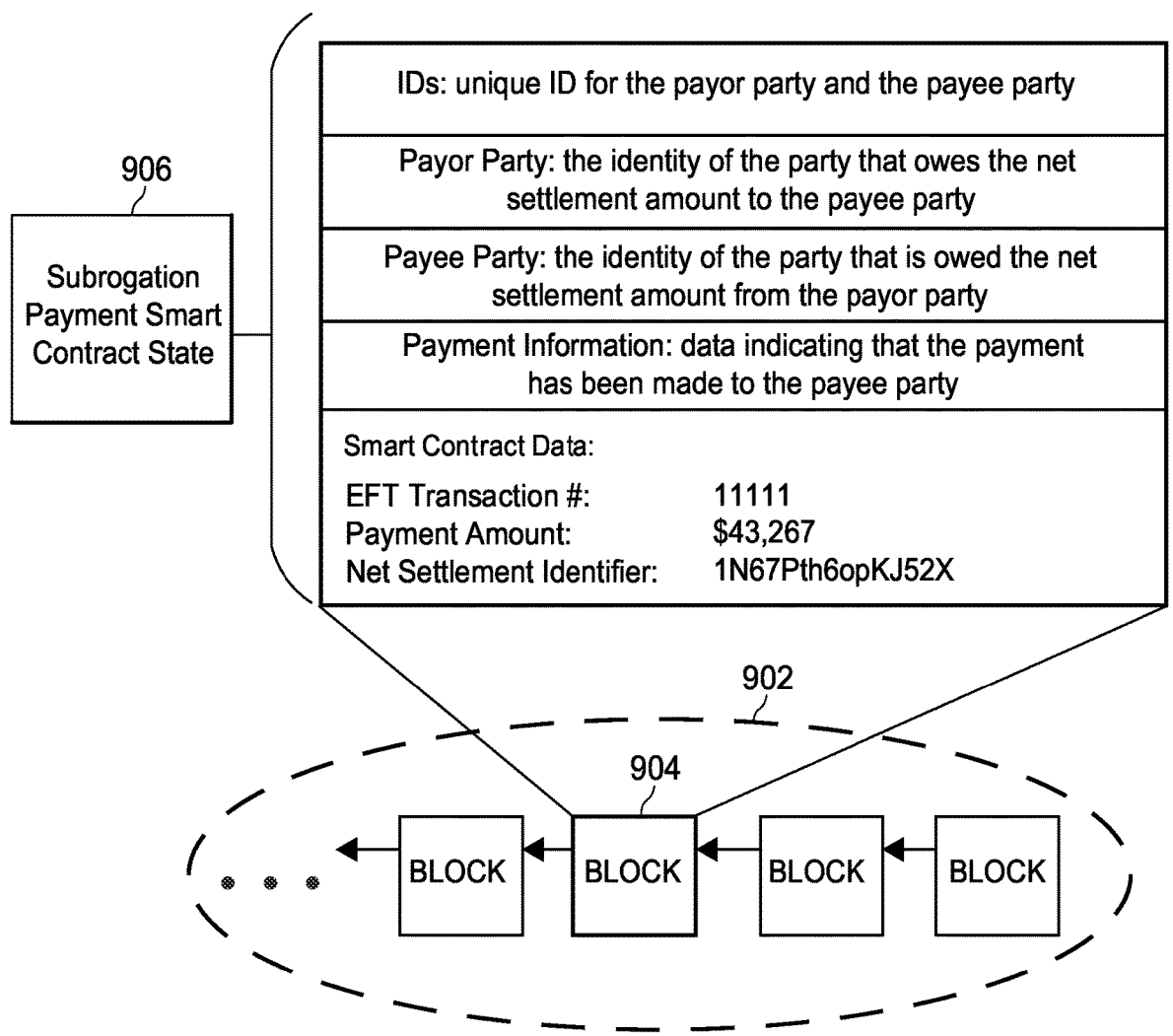
FIG. 9 depicts an exemplary smart contract state in a distributed ledger network for providing proof of payment of a net settlement in subrogation claims between parties over a threshold time period in accordance with one aspect of the present disclosure.

FIG. 9 depicts an exemplary smart contract state 900 in a distributed ledger network for providing proof of payment of a net settlement in subrogation claims between parties over a threshold time period in accordance with one aspect of the present disclosure.

One way of altering the smart contract state 906 is to broadcast a transaction to the subrogation blockchain 902. If the broadcast transaction satisfies consensus rules, network validators may include the transaction in a block 904. Inclusion in the blockchain 902 of a transaction sending data to the smart contract may cause validating nodes to update a state database, thus allowing network participants access to a rich state mechanism to manage the subrogation process and ultimately to resolve the subrogation claims.

In some implementation, the block of transactions 904 may organize the transactions it has received into a Merkle Tree to facilitate access to the stored transactions. The transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the root of the tree, or the node at the top of the tree, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

Subrogation payment smart contract state 906 may include pieces of data to identify and track the subrogation payment smart contract. For example, a contract owner may select a unique ID for the subrogation payment smart contract such that subsequent transactions and data sent to the smart contract can identify the contract by ID number. The contract owner may also specify identities of the parties, such as an identifier of the payor party who owes the net settlement amount and an identifier of the payee party who is owed the net settlement amount. In at least one implementation, the payor party and the payee party are identified by cryptographic public keys assigned to the respective entities. Subsequent data sent to the smart contract may include a message signed by private keys corresponding to the public keys identifying the payor party and the payee party in the smart contract, thus providing cryptographic proof that the transaction was originated by one of the parties. The private and public keys may be managed solely by the parties to minimize the attack surface for any attackers that might attempt to forge a transaction (e.g., the parties generate public/private cryptographic key pairs offline and only provide the public key to other network participants). A party's private keys may be generated according to a securely stored seed value (e.g., on a piece of physical paper or multiple copies of a piece of paper) such that the private keys may be recovered in the case of a data loss.

The smart contract state 906 may further include data from the payor party indicating that the payment has been made to the payee party, such as the payment information. More specifically, the smart contract state 906 may include an EFT transaction number for the payment, the payment amount, account information (or partial account information such as the last four digits) of the account submitting the funds transfer, account information (or partial account information such as the last four digits) of the account receiving the funds transfer, the date of the payment, data representing the net settlement which triggered the payment (e.g., the cryptographic hash value for the net settlement included in the subrogation net settlement smart contract), etc.

Another aspect of the subrogation payment smart contract state 906 is the smart contract data. In at least one implementation, the smart contract data includes the EFT transaction number, the payment amount, and an identifier of the net settlement which triggered the payment.

The subrogation payment smart contract may then transmit the payment information to the payee party upon receiving the payment information from the payor party. In other scenarios, the payee party may monitor the subrogation blockchain 902 to obtain the payment information from the blockchain 902.

Exemplary Subrogation Payment Transaction

Figure 10:
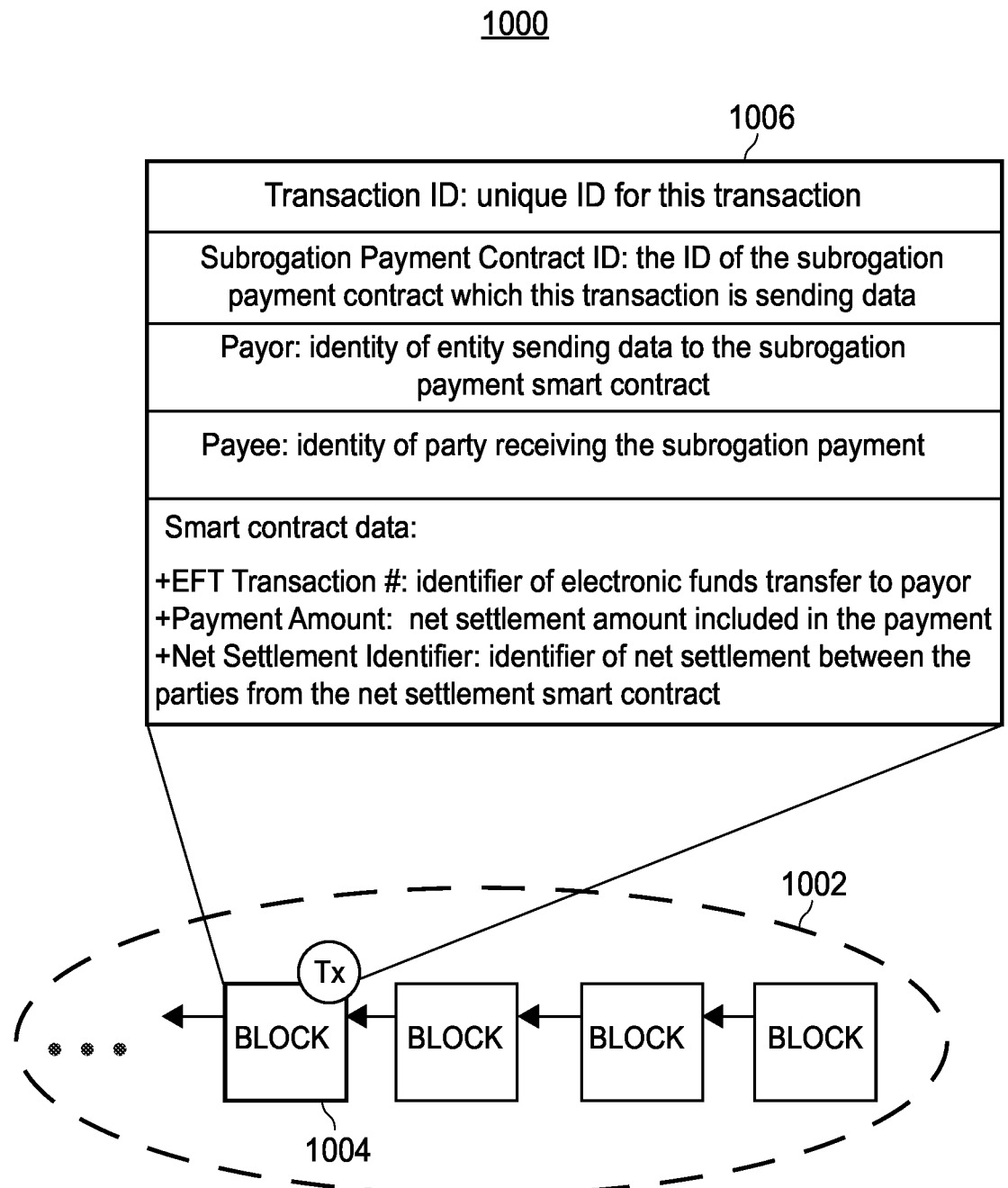
FIG. 10 depicts an exemplary transaction representing payment information by a payor party in a distributed ledger network for providing proof of payment of a net settlement in subrogation claims between parties over a threshold time period associated with one aspect of the present disclosure.

FIG. 10 depicts an exemplary transaction 1000 on a distributed ledger network for providing proof of payment of a net settlement in subrogation claims between parties over a threshold time period in accordance with one aspect of the present disclosure. The transaction 1000 may send data to a smart contract deployed on the blockchain 1002, such as the subrogation payment smart contract as shown in FIG. 9. An originator of the transaction 1000 may broadcast the transaction to nodes on the blockchain network and the transaction 1000 will be included in block 1004 if it is a valid transaction. The transaction 1000 may include various information 1006 regarding the transaction's changes to the subrogation payment smart contract state managed by the blockchain 1002. For example, the transaction 1000 may include the unique subrogation payment contract ID, the originator of the transaction which may be the payor party to the subrogation net settlement, the counterparty which may be the payee party to the subrogation net settlement, and data regarding payment information for the subrogation net settlement. The payment information may include an EFT transaction number, a payment amount, and an identifier of the net settlement which triggered the payment (e.g., the cryptographic hash value for the net settlement included in the subrogation net settlement smart contract). In some implementations, the data regarding the payment information may be a cryptographic hash value calculated by applying a cryptographic hashing algorithm (e.g., SHA-256) to the payment information for the net settlement.

In addition to the subrogation demand, subrogation net settlement, and subrogation payment smart contracts, the distributed ledger system may also include a messaging smart contract that allows parties to a subrogation claim to transmit private messages to each other. The messages may be related to the cryptographic hash values included in transactions between the parties or may be any suitable message. In other implementations, the parties may transmit public messages broadcast to each of the participants in the distributed ledger network.

Figure 11:
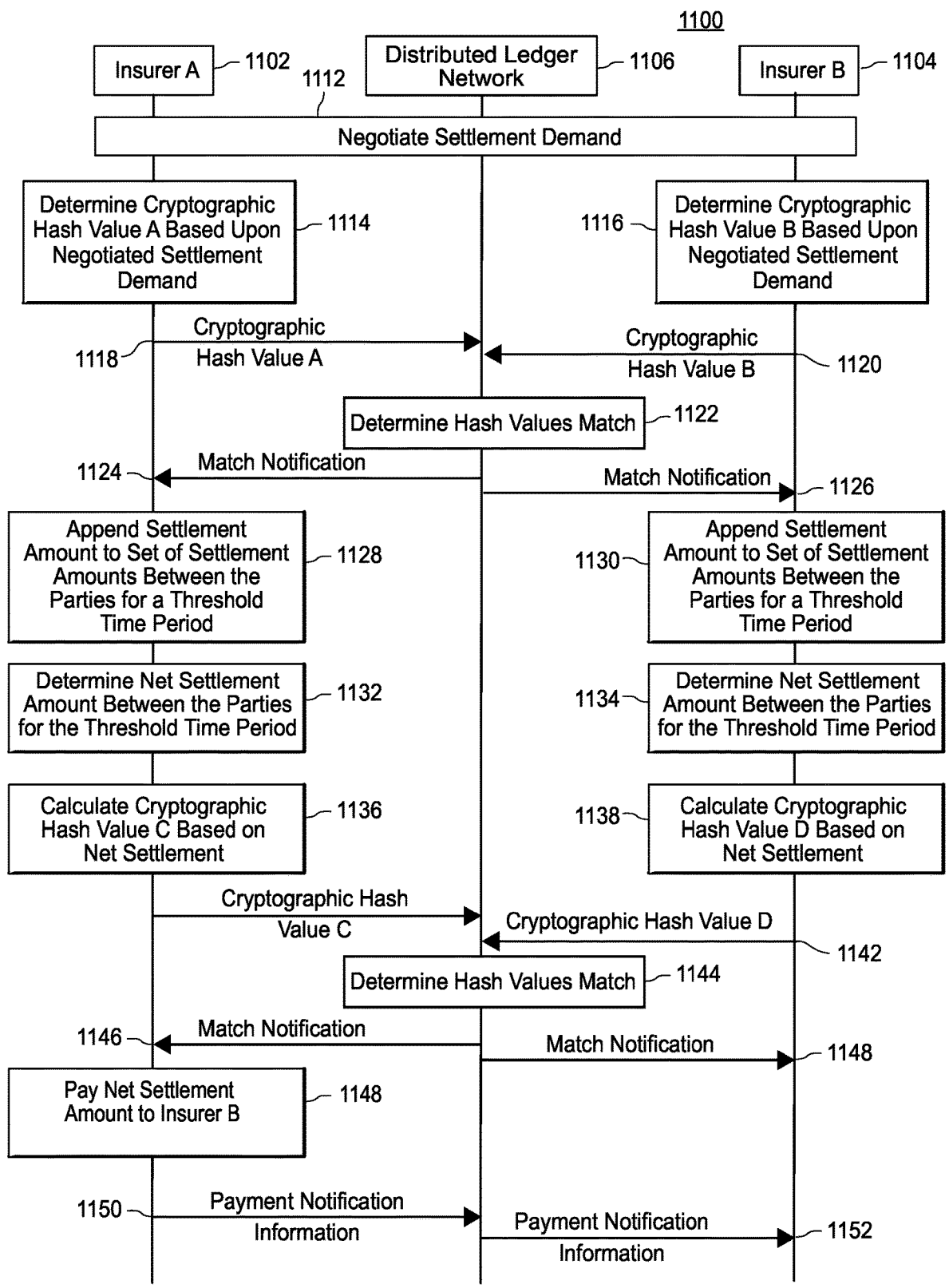
FIG. 11 is a signal diagram of an exemplary process flow for resolving multiple subrogation claims between parties in a distributed ledger network associated with one aspect of the present disclosure.

Exemplary Signal Diagram for Resolving Multiple Subrogation Claims Between Parties in a Distributed Ledger Network FIG. 11 is a signal diagram 1100 of an exemplary process flow for resolving multiple subrogation claims between parties in a distributed ledger network associated with one aspect of the present disclosure. When two parties such as Insurer A 1102 and Insurer B 1104 negotiate a settlement demand (1112) for a subrogation claim, Insurer A 1102 determines a Cryptographic Hash Value A (1114) based upon characteristics of the negotiated settlement demand. For example, Insurer A 1102 may calculate Cryptographic Hash Value A by applying a cryptographic hashing algorithm (e.g., SHA-256) to a unique identifier for the negotiated settlement demand, a demand type (e.g., original or supplemental), a settlement amount, and identifiers of the parties to the subrogation claim. Insurer B 1104 also determines a Cryptographic Hash Value B (1116) based upon the same characteristics of the negotiated settlement demand and using the same cryptographic hashing algorithm as Insurer A.

Then Insurer A 1102 and Insurer B 1104 broadcast Cryptographic Hash Value A (1118) and Cryptographic Hash Value B (1120), respectively, to a distributed ledger network 1106. More specifically, Insurer A 1102 and Insurer B 1104 may broadcast Cryptographic Hash Value A (1118) and Cryptographic Hash Value B (1120), respectively, to a subrogation demand smart contract at a particular address on the distributed ledger network 1106. The subrogation demand smart contract compares Cryptographic Hash Value A and Cryptographic Hash Value B to determine whether they match (1122). If Cryptographic Hash Value A and Cryptographic Hash Value B match, the subrogation demand smart contract transmits notifications (1124, 1126) to Insurer A 1102 and Insurer B 1104 indicating that there is a match.

Accordingly, Insurer A 1102 appends the settlement demand (1128) to a set of settlement demands between Insurer A and Insurer B over a threshold time period (e.g., a day, a week, a month, etc.). In this manner, Insurer A may maintain a list of the subrogation settlements agreed upon with Insurer B in the last day, week, month, etc. Then at the end of the threshold time period, Insurer A may determine a net settlement amount between the parties (1132) based upon each of the subrogation settlements agreed upon with Insurer B over the threshold time period. In this manner, a single payment may be made between the parties for the threshold time period rather than submitting several payments back and forth each day. In some implementations, the net settlement amount is positive when Insurer A owes Insurer B and negative when Insurer B owes Insurer A or vice versa.

Insurer B 1104 also appends the settlement demand (1130) to a set of settlement demands between Insurer A and Insurer B over a threshold time period (e.g., a day, a week, a month, etc.). In this manner, Insurer B may maintain a list of the subrogation settlements agreed upon with Insurer A in the last day, week, month, etc. Then at the end of the threshold time period, Insurer B may determine a net settlement amount between the parties (1142) based upon each of the subrogation settlements agreed upon with Insurer A over the threshold time period.

Also at the end of the threshold time period, Insurer A may determine characteristics of the net settlement with Insurer B based upon the list of subrogation settlements agreed upon with Insurer B. The characteristics of the net settlement may include the net settlement amount as understood by Insurer A, a party identifier of Insurer A such as a company code, a party identifier of Insurer B such as a company code, and data representative of each of the settlement demands agreed upon by the parties over the threshold time period (e.g., cryptographic hash values for each of the settlement demands agreed upon by the parties over the threshold time period).

Insurer A may then calculate Cryptographic Hash Value C (1136) by applying a cryptographic hashing algorithm (e.g., SHA-256) to the characteristics of the net settlement. Insurer B may also determine the same characteristics of the net settlement with Insurer A based upon the list of subrogation settlements agreed upon with Insurer A. The characteristics of the net settlement may include the net settlement amount as understood by Insurer B, a party identifier of Insurer A such as a company code, a party identifier of Insurer B such as a company code, and data representative of each of the settlement demands agreed upon by the parties over the threshold time period (e.g., cryptographic hash values for each of the settlement demands agreed upon by the parties over the threshold time period). Insurer B may then calculate Cryptographic Hash Value D (1138) by applying the same cryptographic hashing algorithm (e.g., SHA-256) to the same characteristics of the net settlement as Insurer A.

Then Insurer A 1102 and Insurer B 1104 broadcast Cryptographic Hash Value C (1140) and Cryptographic Hash Value D (1142), respectively, to the distributed ledger network 1106. More specifically, Insurer A 1102 and Insurer B 1104 may broadcast Cryptographic Hash Value C (1140) and Cryptographic Hash Value C (1142), respectively, to a subrogation net settlement smart contract at a particular address on the distributed ledger network 1106. The subrogation net settlement smart contract compares Cryptographic Hash Value C and Cryptographic Hash Value D to determine whether they match (1144). If Cryptographic Hash Value C and Cryptographic Hash Value D match, the subrogation net settlement smart contract transmits notifications (1146, 1148) to Insurer A 1102 and Insurer B 1104 indicating that there is a match.

If the net settlement amount indicates that Insurer A owes Insurer B for the subrogation claims, Insurer A pays the net settlement amount to Insurer B (1148). Insurer A may then broadcast payment information (1150) for the payment to the distributed ledger network 1106. More specifically, Insurer A 1102 may broadcast the payment information to a subrogation payment smart contract at a particular address on the distributed ledger network 1106. The payment information may include an EFT transaction number for the payment, the payment amount, account information (or partial account information such as the last four digits) of the account submitting the funds transfer, account information (or partial account information such as the last four digits) of the account receiving the funds transfer, the date of the payment, data representing the net settlement which triggered the payment (e.g., the cryptographic hash value for the net settlement included in the subrogation net settlement smart contract), etc.

The subrogation payment smart contract may then transmit the payment information (1152) to Insurer B. In other implementations, Insurer B monitors the distributed ledger network 1106 to view the payment information.

Figure 12:
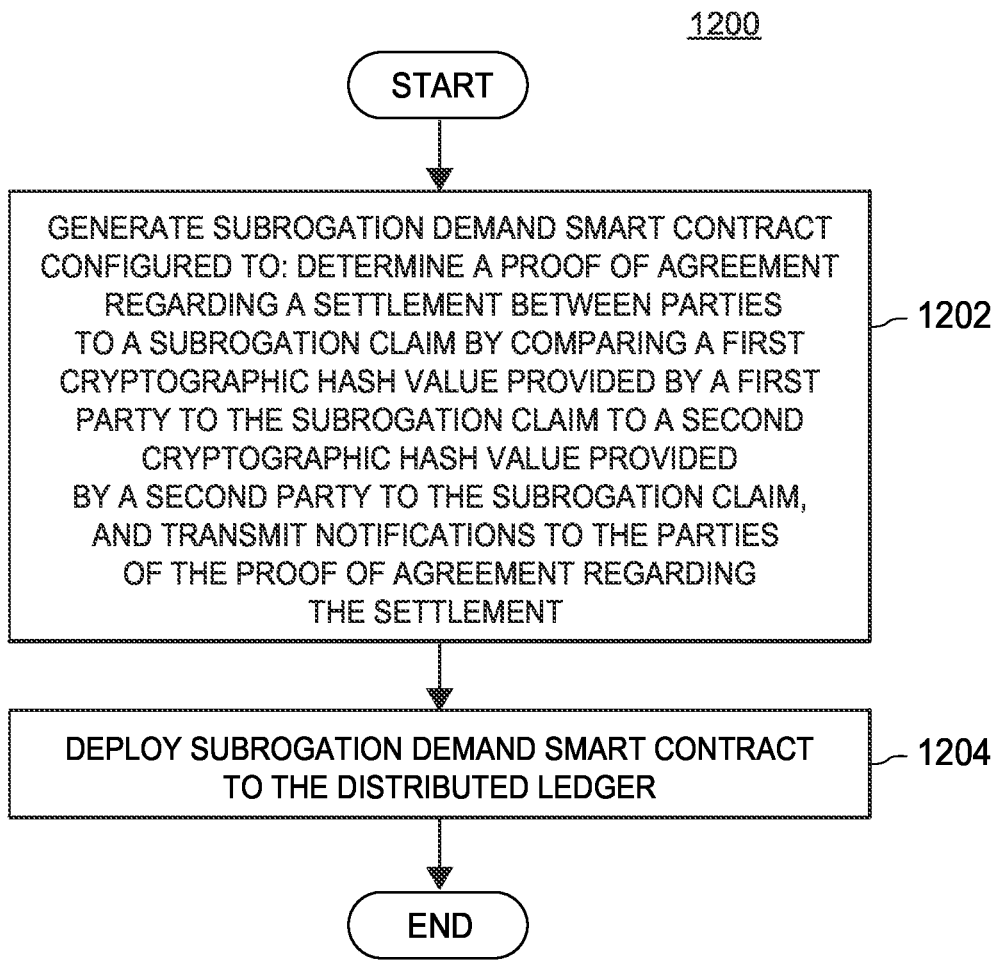
FIG. 12 depicts an exemplary flow diagram for generating a subrogation demand settlement smart contract using a distributed ledger associated with one aspect of the present disclosure.

Exemplary Flow Diagrams for Subrogation
Demand Verification Using A Distributed Ledger FIG. 12 depicts a flow diagram of an exemplary computer-implemented method 1200 for generating a subrogation demand settlement smart contract using a distributed ledger. The method 1200 may begin by generating a subrogation demand settlement smart contract configured to determine a proof of agreement regarding a subrogation demand settlement between a first party and a second party to a subrogation claim, and transmit notifications to the first and second parties of the proof of agreement regarding the subrogation demand settlement (block 1202). Then the subrogation demand settlement smart contract is deployed to an address stored on the distributed ledger (block 1204).

At block 1202, a subrogation demand settlement smart contract is generated. The subrogation demand settlement smart contract is configured to determine a proof of agreement regarding a subrogation demand settlement between a first party and a second party to a subrogation claim. More specifically, the subrogation demand settlement smart contract determines the proof of agreement by receiving a first cryptographic hash value from a first party to the subrogation claims and receiving a second cryptographic hash value from a second party to the subrogation claim. Each of the cryptographic hash values may be determined using the same characteristics of the subrogation demand settlement between the parties and/or using the same cryptographic hashing algorithm. In this manner, the first and second parties submit the first and second cryptographic hash values as proof of agreement of the subrogation demand settlement. If the first and second cryptographic hash values are the same, then both parties calculated the cryptographic hash values using the same values for the subrogation demand settlement characteristics, such as the same subrogation demand settlement amount. Therefore, submitting the same cryptographic hash value proves that both parties agreed on the subrogation demand settlement amount.

The subrogation demand settlement smart contract compares the first cryptographic hash value to the second cryptographic hash value to determine if the values match. If the values match, the subrogation demand settlement smart contract is configured to transmit notifications to the first and second parties of the proof of agreement between the parties. The notifications may cause the payor party to pay the subrogation demand settlement amount to the payee party. If the values do not match, the subrogation demand settlement smart contract is configured to transmit notifications to the first and second parties indicating there is no agreement. The first and second parties may then further review the characteristics of the subrogation demand settlement with each other to see where there may be a dispute and may resolve the dispute.

At block 1204, the subrogation demand settlement smart contract is deployed to an address stored on the distributed ledger. The deployed subrogation demand settlement smart contract may expose methods and data to other participants in the distributed ledger network. Some of the data in the smart contract state may be private data that may only be altered by calling a method of the smart contract, or only altered by authorized distributed ledger participants. One way of altering the smart contract state is to broadcast a transaction to the distributed ledger network. If the broadcasted transaction satisfies consensus rules, network validators may include the transaction in the distributed ledger.

In some embodiments, validating nodes execute the code contained in the smart contract and parties to the subrogation claims provide transactions which alter the smart contract state.

Figure 13:
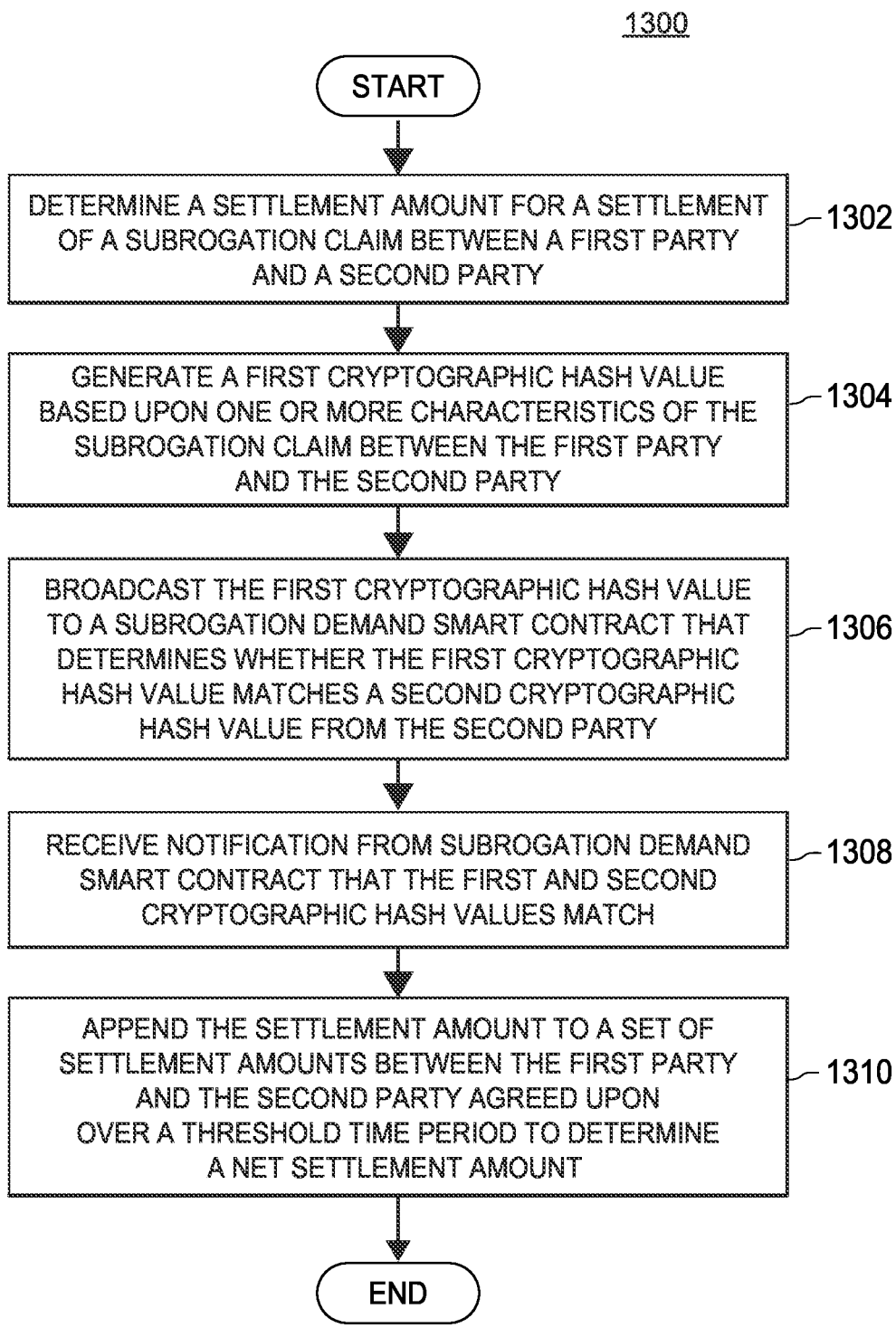
FIG. 13 depicts an exemplary flow diagram for verifying a subrogation demand settlement between a first party and a second party using a distributed ledger associated with one aspect of the present disclosure.

FIG. 13 depicts a flow diagram of an exemplary computer-implemented method 1300 for verifying a subrogation demand settlement of multiple subrogation claims between a first party and a second party using a distributed ledger. The method 1300 may begin by determining a subrogation demand settlement amount for a subrogation claim between the first party and a second party (block 1302). The first party may generate a first cryptographic hash value based upon characteristics of the subrogation demand settlement (block 1304), and broadcast the first cryptographic hash value to a subrogation demand settlement smart contract that determines whether the first cryptographic hash value matches a second cryptographic hash value from the second party (block 1306). The first party receives a notification from the subrogation demand settlement smart contract that the first and second cryptographic hash values match (block 1308), and provides a single payment of the subrogation demand settlement amount to the second party (block 1310).

At block 1302, a first party determines a subrogation settlement amount for a subrogation claim between the first party and a second party. For example, the first and second parties may negotiate the subrogation settlement amount off-chain.

Then, at block 1304, the first party generates a first cryptographic hash value by applying a cryptographic hashing algorithm (e.g., SHA-256) to the characteristics of the subrogation demand settlement. The characteristics of the subrogation demand settlement may include a demand identifier, a demand type (such as original or supplemental), a settlement amount, and/or a company code of one of the first and second parties providing the settlement. The first party then broadcasts the first cryptographic hash value to a subrogation demand settlement smart contract at a particular address on the distributed ledger network (block 1306). The subrogation demand settlement smart contract compares the first cryptographic hash value to a second cryptographic hash value determined by the second party using the same characteristics of the subrogation demand settlement and the same cryptographic hashing algorithm to determine whether the first cryptographic hash value and the second cryptographic hash value match.

At block 1308, the first party receives a notification from the subrogation demand settlement smart contract indicating that the first cryptographic hash value and the second cryptographic hash value match.

The settlement amount may then be appended to a set of settlement amounts between the first party and the second party agreed upon over a threshold time period to determine a net settlement amount with the second party over the threshold time period (block 1310).

Figure 14:
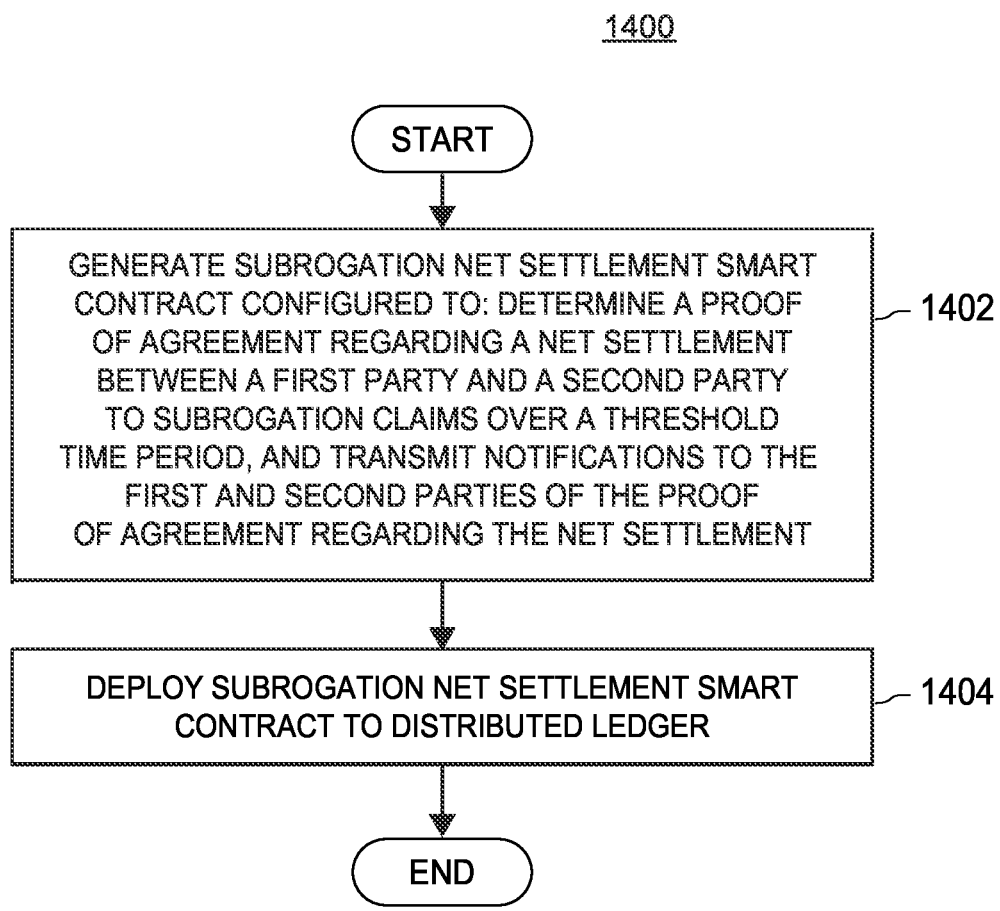
FIG. 14 depicts an exemplary flow diagram for generating a subrogation net settlement smart contract using a distributed ledger associated with one aspect of the present disclosure.

Exemplary Flow Diagrams for Subrogation Net Settlement Using a Distributed Ledger FIG. 14 depicts a flow diagram of an exemplary computer-implemented method 1400 for generating a subrogation net settlement smart contract using a distributed ledger. The method 1400 may begin by generating a subrogation net settlement smart contract configured to determine a proof of agreement regarding a net settlement between a first party and a second party to subrogation claims over a threshold time period, and transmit notifications to the first and second parties of the proof of agreement regarding the net settlement (block 1402). Then the subrogation net settlement smart contract is deployed to an address stored on the distributed ledger (block 1404).

At block 1402, a subrogation net settlement smart contract is generated. The subrogation net settlement smart contract is configured to determine a proof of agreement regarding a net settlement between a first party and a second party to subrogation claims over a threshold time period. More specifically, the subrogation net settlement smart contract determines the proof of agreement by receiving a first cryptographic hash value from a first party to the subrogation claims and receiving a second cryptographic hash value from a second party to the subrogation claims. Each of the cryptographic hash values may be determined using the same characteristics of the net settlement between the parties and/or using the same cryptographic hashing algorithm. In this manner, the first and second parties submit the first and second cryptographic hash values as proof of agreement of the net settlement. If the first and second cryptographic hash values are the same, then both parties calculated the cryptographic hash values using the same values for the net settlement characteristics, such as the same net settlement amount. Therefore, submitting the same cryptographic hash value proves that both parties agreed on the net settlement amount.

The subrogation net settlement smart contract compares the first cryptographic hash value to the second cryptographic hash value to determine if the values match. If the values match, the subrogation net settlement smart contract is configured to transmit notifications to the first and second parties of the proof of agreement between the parties. The notifications may cause the payor party to pay the net settlement amount to the payee party. If the values do not match, the subrogation net settlement smart contract is configured to transmit notifications to the first and second parties indicating there is no agreement. The first and second parties may then further review the characteristics of the net settlement with each other to see where there may be a dispute and may resolve the dispute.

At block 1404, the subrogation net settlement smart contract is deployed to an address stored on the distributed ledger. The deployed subrogation net settlement smart contract may expose methods and data to other participants in the distributed ledger network. Some of the data in the smart contract state may be private data that may only be altered by calling a method of the smart contract, or only altered by authorized distributed ledger participants. One way of altering the smart contract state is to broadcast a transaction to the distributed ledger network. If the broadcasted transaction satisfies consensus rules, network validators may include the transaction in the distributed ledger.

In some embodiments, validating nodes execute the code contained in the smart contract and parties to the subrogation claims provide transactions which alter the smart contract state.

Figure 15:
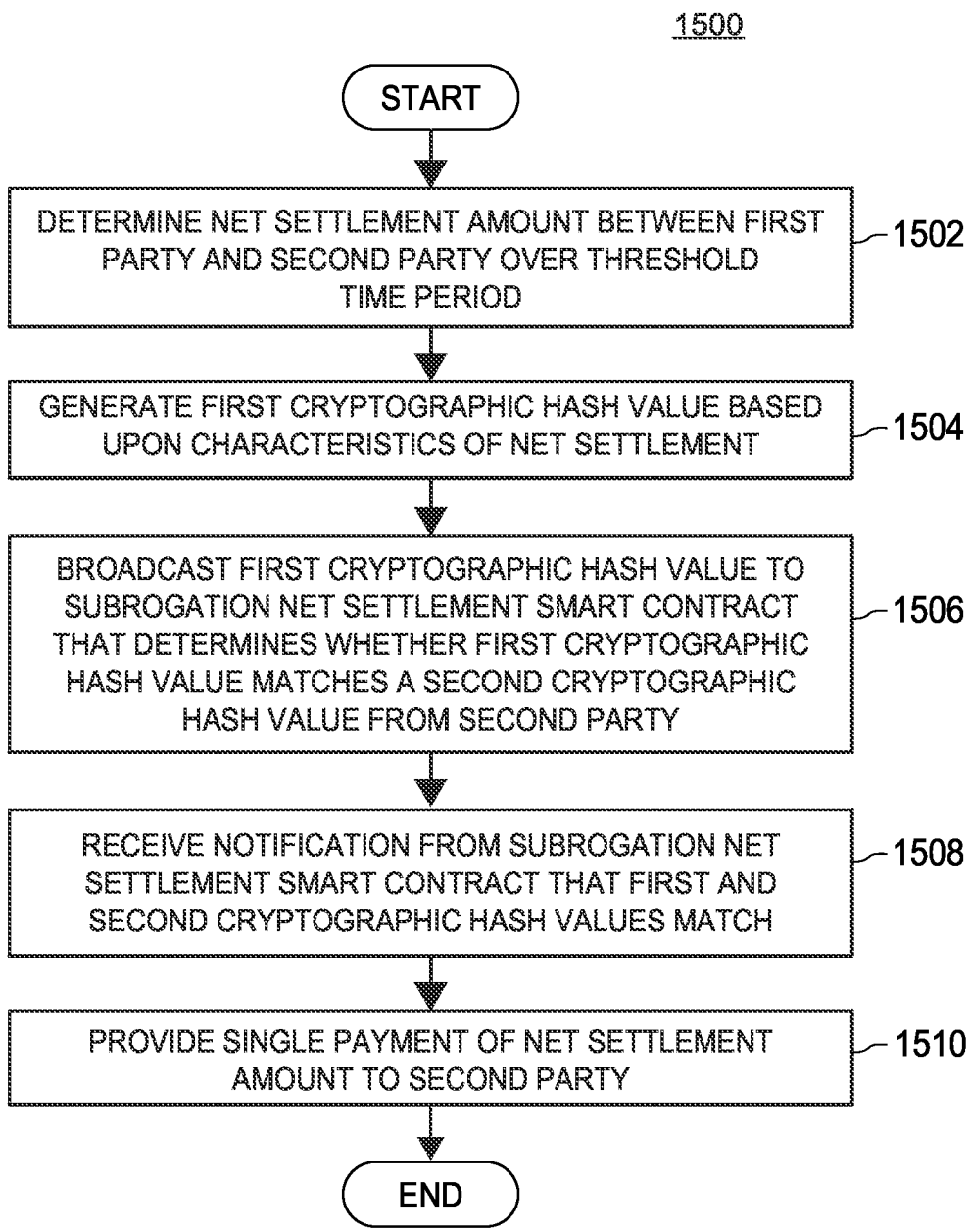
FIG. 15 depicts an exemplary flow diagram for verifying a net settlement of multiple subrogation claims between a first party and a second party using a distributed ledger associated with one aspect of the present disclosure.

FIG. 15 depicts a flow diagram of an exemplary computer-implemented method 1500 for verifying a net settlement of multiple subrogation claims between a first party and a second party using a distributed ledger. The method 1500 may begin by determining a net settlement amount for subrogation claims between the first party and a second party over a threshold time period (block 1502). The first party may generate a first cryptographic hash value based upon characteristics of the net settlement (block 1504), and broadcast the first cryptographic hash value to a subrogation net settlement smart contract that determines whether the first cryptographic hash value matches a second cryptographic hash value from the second party (block 1506). The first party receives a notification from the subrogation net settlement smart contract that the first and second cryptographic hash values match (block 1508), and provides a single payment of the net settlement amount to the second party (block 1510).

At block 1502, a first party determines a net settlement amount for subrogation claims between the first party and a second party over a threshold time period by aggregating the settlement amounts for each of the settlements agreed upon by the parties during the threshold time period. The first party may aggregate settlement amounts for settlements which were verified via the subrogation demand smart contract.

Then at block 1504, the first party generates a first cryptographic hash value by applying a cryptographic hashing algorithm (e.g., SHA-256) to the characteristics of the net settlement. The characteristics of the net settlement may include the net settlement amount as understood by Insurer A, a party identifier of Insurer A such as a company code, a party identifier of Insurer B such as a company code, and data representative of each of the settlement demands agreed upon by the parties over the threshold time period (e.g., cryptographic hash values for each of the settlement demands agreed upon by the parties over the threshold time period).

The first party then broadcasts the first cryptographic hash value to a subrogation net settlement smart contract at a particular address on the distributed ledger network (block 1506). The subrogation net settlement smart contract compares the first cryptographic hash value to a second cryptographic hash value determined by the second party using the same characteristics of the net settlement and the same cryptographic hashing algorithm to determine whether the first cryptographic hash value and the second cryptographic hash value match.

At block 1508, the first party receives a notification from the subrogation net settlement smart contract indicating that the first cryptographic hash value and the second cryptographic hash value match.

If the net settlement amount indicates that the first party owes the second party for the subrogation claims, the first party provides a single payment to the second party for the net settlement amount (block 1510). The first party may then broadcast payment information for the payment to the distributed ledger network. More specifically, the first party may broadcast the payment information to a subrogation payment smart contract at a particular address on the distributed ledger network. The payment information may include an EFT transaction number for the payment, the payment amount, account information (or partial account information such as the last four digits) of the account submitting the funds transfer, account information (or partial account information such as the last four digits) of the account receiving the funds transfer, the date of the payment, data representing the net settlement which triggered the payment (e.g., the cryptographic hash value for the net settlement included in the subrogation net settlement smart contract), etc.

The subrogation payment smart contract may then transmit the payment information to the second party. In other implementations, the second party monitors the distributed ledger network to view the payment information.

Exemplary Computer-Implemented Methods for
Verifying a Settlement of a Subrogation Claim
Using a Distributed Ledger In one aspect, a computer-implemented method for generating a subrogation demand smart contract using a distributed ledger may be provided. The method may include, via one or more processors, servers, and/or associated transceivers: (1) generating a subrogation demand smart contract configured to: determine a proof of agreement regarding a settlement between parties to a subrogation claim by comparing a first cryptographic hash value provided by a first party to the subrogation claim to a second cryptographic hash value provided by a second party to the subrogation claim and determining that there is proof of agreement in response to determining that the first and second cryptographic hash values match, wherein each of the first and second cryptographic hash values are determined based upon one or more characteristics of the settlement; and transmit notifications to the parties of the proof of agreement regarding the settlement to allow the parties to verify terms of the settlement; and/or (2) deploying the subrogation demand smart contract to a distributed ledger maintained by a plurality of participants in a distributed ledger network. The method may include additional, less, or alternate actions, including those discussed elsewhere herein.

For instance, the first party and the second party may determine the first cryptographic hash value and the second cryptographic hash value, respectively, using a same set of one or more characteristics of the settlement.

Additionally, the one or more characteristics of the settlement may include at least one of: a demand identifier, a demand type, a settlement amount, and/or a company code of one of the first and second parties providing the settlement.

The subrogation demand smart contract may be further configured to: determine that there is no proof of agreement in response to determining that the first and second cryptographic hash values do not match; and/or transmit notifications to the parties indicating that there is no proof of agreement regarding the settlement.

Systems or computer-readable media storing instructions for implementing all or part of the method described above may also be provided in some aspects. Systems for implementing such methods may include one or more of the following: a special-purpose assessment computing device, a mobile computing device, a remote server, one or more local or remote sensors, one or more communication modules configured to communicate wirelessly via radio links, radio frequency links, and/or wireless communication channels, and/or one or more program memories coupled to one or more processors of the mobile computing device, or remote server. Such program memories may store instructions to cause the one or more processors to implement part or all of the method described above. Additional or alternative features described herein below may be included in some aspects.

In another aspect, a computer-implemented method of verifying a settlement of a subrogation claim using a distributed ledger may be provided. The method may include, via one or more processors, servers, and/or associated transceivers: (1) determining, by a first party, a settlement amount for a settlement of a subrogation claim between the first party and a second party; (2) generating a first cryptographic hash value based upon one or more characteristics of the settlement between the first party and the second party; (3) broadcasting the first cryptographic hash value to a subrogation demand smart contract deployed to a distributed ledger and maintained by a plurality of participants in a distributed ledger network as a proof of agreement of the settlement between the first and second party, wherein the subrogation demand smart contract compares the first cryptographic hash value submitted by the first party to a second cryptographic hash value submitted by the second party to determine if there is a match; (4) receiving a notification from the subrogation demand smart contract that the first and second cryptographic hash values match indicating there is proof of agreement between the first party and second party; and/or (5) appending the settlement amount to a set of settlement amounts between the first party and the second party agreed upon over a threshold time period to determine a net settlement amount with the second party over the threshold time period. The method may include additional, less, or alternate actions, including those discussed elsewhere herein.

For instance, the first party and the second party may determine the first cryptographic hash value and the second cryptographic hash value, respectively, using a same set of one or more characteristics of the settlement.

Additionally, the one or more characteristics of the settlement may include at least one of: a demand identifier, a demand type, a settlement amount, and/or a company code of one of the first and second parties providing the settlement.

The method may further include, via the one or more processors, servers, and/or associated transceivers: determining a supplemental settlement amount for a supplement settlement of the subrogation claim between the first party and a second party based upon additional items or expenses which were not included in the settlement; generating a third cryptographic hash value based upon one or more characteristics of the supplement settlement between the first party and the second party; broadcasting the third cryptographic hash value to a subrogation demand smart contract deployed to a distributed ledger and maintained by a plurality of participants in a distributed ledger network as a proof of agreement of the supplemental settlement between the first and second party, wherein the subrogation demand smart contract compares the third cryptographic hash value submitted by the first party to a fourth cryptographic hash value submitted by the second party to determine if there is a match; receiving a notification from the subrogation demand smart contract that the third and fourth cryptographic hash values match indicating there is proof of agreement between the first party and second party; and/or appending the supplemental settlement amount to the set of settlement amounts between the first party and the second party agreed upon over the threshold time period to determine the net settlement amount with the second party over the threshold time period.

Moreover, determining a settlement amount may include determining a partial settlement amount based upon a subset of items or expenses in the subrogation claim.

Further, generating a first cryptographic hash value may include generating the first cryptographic hash value based upon one or more characteristics of the partial settlement between the first party and the second party; and/or appending the settlement amount includes appending the partial settlement amount to the set of settlement amounts between the first party and the second party agreed upon over the threshold time period.

Additionally, the subset of items or expenses in the subrogation claim may be a first subset of items or expenses in the subrogation claim and the additional items or expenses may be a second subset of items or expenses in the subrogation claim which were not agreed upon in the settlement.

Furthermore, the additional items or expenses may be submitted by the first or second party after the settlement has been agreed upon. Also, the first cryptographic hash value may be generated by a third-party aggregator or service provider.

Moreover, the subrogation claim may include at least a third party, and the subrogation demand smart contract may compare the first cryptographic hash value submitted by the first party, the second cryptographic hash value submitted by the second party, and at least a third cryptographic hash value submitted by the at least third party to determine if there is a match.

The method may further include, via the one or more processors, servers, and/or associated transceivers: transmitting a message to a messaging smart contract deployed to the distributed ledger and maintained by the plurality of participants in the distributed ledger network, wherein the message is viewable by the second party.

Systems or computer-readable media storing instructions for implementing all or part of the method described above may also be provided in some aspects. Systems for implementing such methods may include one or more of the following: a special-purpose assessment computing device, a mobile computing device, a remote server, one or more local or remote sensors, one or more communication modules configured to communicate wirelessly via radio links, radio frequency links, and/or wireless communication channels, and/or one or more program memories coupled to one or more processors of the mobile computing device, or remote server. Such program memories may store instructions to cause the one or more processors to implement part or all of the method described above. Additional or alternative features described herein below may be included in some aspects.

Exemplary Computer-Implemented Methods for Subrogation Net Settlement Using a Distributed Ledger In one aspect, a computer-implemented method for generating a subrogation net settlement smart contract using a distributed ledger may be provided. The method may include, via one or more processors, servers, and/or associated transceivers: (1) generating a subrogation net settlement smart contract configured to: (i) determine a proof of agreement regarding a net settlement including an aggregation of a plurality of settlements between a first party and a second party to a plurality of subrogation claims over a threshold time period by comparing a first cryptographic hash value provided by the first party to a second cryptographic hash value provided by the second party, and determining that there is proof of agreement in response to determining that the first and second cryptographic hash values match, wherein each of the first and second cryptographic hash values are determined based upon one or more characteristics of the net settlement between the first and second parties over the threshold time period; and/or (ii) transmit notifications to the first and second parties of the proof of agreement regarding the net settlement to allow the first and second parties to verify terms of the net settlement and provide a single payment for each of the plurality of settlements over the threshold time period; and/or (2) deploying the subrogation net settlement smart contract to a distributed ledger maintained by a plurality of participants in a distributed ledger network (such as by transmitting the subrogation net settlement smart contract via wireless communication or data transmission over one or more radio frequency links or communication channels). The method may include additional, less, or alternate actions, including those discussed elsewhere herein.

For instance, the method may include generating a subrogation payment smart contract configured to receive, from a payor party of the first or second party, payment information indicating that the payor party paid a net settlement amount to a payee party of the first or second party, and transmit a notification to the payee party indicating that the net settlement amount has been paid. Moreover, the method may include deploying the subrogation payment smart contract to the distributed ledger maintained by the plurality of participants in the distributed ledger network.

The payment information may include at least one of: the first or second cryptographic hash value, an identifier of the payor party, an identifier of the payee party, a transaction identifier for the payment, a transaction amount for the payment, and/or a date of the payment.

Additionally, the subrogation net settlement smart contract may further be configured to determine that there is no proof of agreement in response to determining that the first and second cryptographic hash values do not match, and/or transmit notifications to the parties indicating that there is no proof of agreement regarding the net settlement.

Alternatively, the subrogation net settlement smart contract may further be configured to receive, from the first or second party, an indication that the net settlement amount has been paid, and/or set a flag indicating that the net settlement amount has been paid.

The first party and the second party may determine the first cryptographic hash value and the second cryptographic hash value, respectively, using a same set of one or more characteristics of the net settlement. The one or more characteristics of the net settlement may include at least one of: a net settlement identifier, a net settlement amount, a company code of one of the first and second parties providing the net settlement, and/or a plurality of cryptographic hash values representing the plurality of settlements included in the net settlement.

Systems or computer-readable media storing instructions for implementing all or part of the system described above may also be provided in some aspects. Systems for implementing such methods may include one or more of the following: a special-purpose assessment computing device, a mobile computing device, a remote server, one or more local or remote sensors, one or more communication modules configured to communicate wirelessly via radio links, radio frequency links, and/or wireless communication channels, and/or one or more program memories coupled to one or more processors of the mobile computing device, or remote server. Such program memories may store instructions to cause the one or more processors to implement part or all of the method described above. Additional or alternative features described herein below may be included in some aspects.

In another aspect, a computer-implemented method of verifying a net settlement of a plurality of subrogation claims between a first party and a second party using a distributed ledger may be provided. The method may include, via one or more processors, servers, and/or associated transceivers: (1) determining, by a first party, a net settlement amount including an aggregation of a plurality of settlements between the first party and a second party to a plurality of subrogation claims over a threshold time period; (2) generating a first cryptographic hash value based upon one or more characteristics of the net settlement over the threshold time period between the first party and the second party; (3) broadcasting the first cryptographic hash value to a subrogation net settlement smart contract deployed to a distributed ledger and maintained by a plurality of participants in a distributed ledger network as a proof of agreement of the net settlement between the first and second party, wherein the subrogation demand smart contract compares the first cryptographic hash value submitted by the first party to a second cryptographic hash value submitted by the second party to determine if there is a match; (4) receiving a notification from the subrogation net settlement smart contract that the first and second cryptographic hash values match indicating that there is proof of agreement between the first party and second party; and/or (5) in response to receiving the notification, providing a single payment of the net settlement amount to the second party. The method may include additional, less, or alternate actions, including those discussed elsewhere herein.

For instance, the method may include broadcasting payment information to a subrogation payment smart contract indicating that the first party paid the net settlement amount to the second party. The payment information may include at least one of: the first or second cryptographic hash value, an identifier of the first party, an identifier of the second party, a transaction identifier for the payment, a transaction amount for the payment, and/or a date of the payment.

Additionally, the method may include broadcasting to the subrogation net settlement smart contract an indication that the net settlement amount has been paid.

The first party and the second party may determine the first cryptographic hash value and the second cryptographic hash value, respectively, using a same set of one or more characteristics of the net settlement. The one or more characteristics of the net settlement may include at least one of: a net settlement identifier, a net settlement amount, a company code of one of the first and second parties providing the net settlement, and/or a plurality of cryptographic hash values representing the plurality of settlements included in the net settlement. The threshold time period may be at least one of: a day, a week, and/or a month. Also, the first cryptographic hash value may be generated by a third-party aggregator or service provider.

Moreover, the plurality of subrogation claims may include at least a third party, and the subrogation net settlement smart contract may compare the first cryptographic hash value submitted by the first party, the second cryptographic hash value submitted by the second party, and at least a third cryptographic hash value submitted by the at least third party to determine if there is a match.

The method may further include, via the one or more processors, servers, and/or associated transceivers: transmitting a message to a messaging smart contract deployed to the distributed ledger and maintained by the plurality of participants in the distributed ledger network, wherein the message is viewable by the second party.

Systems or computer-readable media storing instructions for implementing all or part of the system described above may also be provided in some aspects. Systems for implementing such methods may include one or more of the following: a special-purpose assessment computing device, a mobile computing device, a remote server, one or more local or remote sensors, one or more communication modules configured to communicate wirelessly via radio links, radio frequency links, and/or wireless communication channels, and/or one or more program memories coupled to one or more processors of the mobile computing device, or remote server. Such program memories may store instructions to cause the one or more processors to implement part or all of the method described above. Additional or alternative features described herein below may be included in some aspects.

Additional Considerations

This detailed description is to be construed as exemplary only and does not describe every possible embodiment, as describing every possible embodiment would be impractical, if not impossible. One may be implement numerous alternate embodiments, using either current technology or technology developed after the filing date of this application.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The invention claimed is:

1. A computer-implemented method for generating a subrogation demand smart contract using a distributed ledger, the method comprising, via one or more processors, servers, and/or associated transceivers:
generating the subrogation demand smart contract for the distributed ledger in a distributed ledger network maintained by a plurality of participants each executing code in the subrogation demand smart contract to reach a distributed consensus on a state of the subrogation demand smart contract, the subrogation demand smart contract configured to:
determine a proof of agreement regarding a settlement between a first party and a second party to a subrogation claim by comparing a first cryptographic hash value provided by the first party to a second cryptographic hash value provided by the second party, and determining that there is proof of agreement in response to determining that the first and second cryptographic hash values match, wherein each of the first and second cryptographic hash values are determined based upon a same set of one or more characteristics of the settlement between the first and second parties; and
record the proof of agreement regarding the settlement in the distributed ledger to allow the first and second parties to verify terms of the settlement; and
deploying the subrogation demand smart contract to the distributed ledger maintained by the plurality of participants in the distributed ledger network.

2. The computer-implemented method of claim 1, wherein the one or more characteristics of the settlement include at least one of: a demand identifier, a demand type, a settlement amount, or a company code of one of the first and second parties providing the settlement.

3. The computer-implemented method of claim 1, wherein the subrogation demand smart contract is further configured to:

determine that there is no proof of agreement in response to determining that the first and second cryptographic hash values do not match; and transmit notifications to the parties indicating that there is no proof of agreement regarding the settlement.

4. A computer-implemented method of verifying a settlement of a subrogation claim between a first party and a second party using a distributed ledger, the method comprising, via one or more processors, servers, and/or associated transceivers:

determining, by the first party, a settlement amount for the settlement of the subrogation claim between the first party and the second party;

generating a first cryptographic hash value based upon one or more characteristics of the settlement between the first party and the second party;

broadcasting the first cryptographic hash value to a subrogation demand smart contract deployed to the distributed ledger and maintained by a plurality of participants in a distributed ledger network as a proof of agreement of the settlement between the first and second party, each of the plurality of participants executing code in the subrogation demand smart contract to reach a distributed consensus on a state of the subrogation demand smart contract, wherein the subrogation demand smart contract compares the first cryptographic hash value submitted by the first party to a second cryptographic hash value submitted by the second party to determine if there is a match;

obtaining an indication from the subrogation demand smart contract that the first and second cryptographic hash values match indicating there is proof of agreement between the first party and second party; and appending the settlement amount to a set of settlement amounts between the first party and the second party agreed upon over a threshold time period to determine a net settlement amount with the second party over the threshold time period.

5. The computer-implemented method of claim 4, wherein the first party and the second party determine the first cryptographic hash value and the second cryptographic hash value, respectively, using a same set of one or more characteristics of the settlement.

6. The computer-implemented method of claim 4, wherein the one or more characteristics of the settlement include at least one of: a demand identifier, a demand type, a settlement amount, or a company code of one of the first and second parties providing the settlement.

7. The computer-implemented method of claim 4, further comprising:

determining a supplemental settlement amount for a supplement settlement of the subrogation claim between the first party and a second party based upon additional items or expenses which were not included in the settlement;

generating a third cryptographic hash value based upon one or more characteristics of the supplement settlement between the first party and the second party;

broadcasting the third cryptographic hash value to the subrogation demand smart contract deployed to the distributed ledger and maintained by the plurality of participants in the distributed ledger network as a proof of agreement of the supplemental settlement between the first and second party, wherein the subrogation demand smart contract compares the third cryptographic hash value submitted by the first party to a fourth cryptographic hash value submitted by the second party to determine if there is a match;

obtaining an indication from the subrogation demand smart contract that the third and fourth cryptographic hash values match indicating there is proof of agreement between the first party and second party; and appending the supplemental settlement amount to the set of settlement amounts between the first party and the second party agreed upon over the threshold time period to determine the net settlement amount with the second party over the threshold time period.

8. The computer-implemented method of claim 7, wherein determining a settlement amount includes determining a partial settlement amount based upon a subset of items or expenses in the subrogation claim.

9. The computer-implemented method of claim 8, wherein:

generating a first cryptographic hash value includes generating the first cryptographic hash value based upon one or more characteristics of the partial settlement between the first party and the second party; and appending the settlement amount includes appending the partial settlement amount to the set of settlement amounts between the first party and the second party agreed upon over the threshold time period.

10. The computer-implemented method of claim 8, wherein the subset of items or expenses in the subrogation claim are a first subset of items or expenses in the subrogation claim and wherein the additional items or expenses are a second subset of items or expenses in the subrogation claim which were not agreed upon in the settlement.

11. The computer-implemented method of claim 7, wherein the additional items or expenses are submitted by the first or second party after the settlement has been agreed upon.

12. The computer-implemented method of claim 4, wherein the subrogation claim further includes at least a third party, and the subrogation demand smart contract compares the first cryptographic hash value submitted by the first party, the second cryptographic hash value submitted by the second party, and at least a third cryptographic hash value submitted by the at least third party to determine if there is a match.

13. The computer-implemented method of claim 4, wherein the first cryptographic hash value is generated by a third-party aggregator or service provider.

14. The computer-implemented method of claim 4, further comprising:

transmitting a message to a messaging smart contract deployed to the distributed ledger and maintained by the plurality of participants in the distributed ledger network, wherein the message is viewable by the second party.

15. A computer system for verifying a settlement of a subrogation claim between a first party and a second party using a distributed ledger, the computer system comprising:

a network interface;

one or more processors; and a non-transitory computer-readable memory storing instructions thereon, that when executed by the one or more processors, cause the one or more processors to:

determine, by the first party, a settlement amount for the settlement of the subrogation claim between the first party and the second party;

generate a first cryptographic hash value based upon one or more characteristics of the settlement between the first party and the second party;

broadcast, via the network interface, the first cryptographic hash value to a subrogation demand smart contract deployed to the distributed ledger and maintained by a plurality of participants in a distributed ledger network as a proof of agreement of the settlement between the first and second party, each of the plurality of participants executing code in the subrogation demand smart contract to reach a distributed consensus on a state of the subrogation demand smart contract, wherein the subrogation demand smart contract compares the first cryptographic hash value submitted by the first party to a second cryptographic hash value submitted by the second party to determine if there is a match;

obtain an indication from the subrogation demand smart contract that the first and second cryptographic hash values match indicating there is proof of agreement between the first party and second party; and append the settlement amount to a set of settlement amounts between the first party and the second party agreed upon over a threshold time period to determine a net settlement amount with the second party over the threshold time period.

16. The computer system of claim 15, wherein the first party and the second party determine the first cryptographic hash value and the second cryptographic hash value, respectively, using a same set of one or more characteristics of the settlement.

17. The computer system of claim 15, wherein the one or more characteristics of the settlement include at least one of: a demand identifier, a demand type, a settlement amount, or a company code of one of the first and second parties providing the settlement.

18. The computer system of claim 15, wherein the instructions further cause the one or more processors to:

determine a supplemental settlement amount for a supplement settlement of the subrogation claim between the first party and a second party based upon additional items or expenses which were not included in the settlement;

generate a third cryptographic hash value based upon one or more characteristics of the supplement settlement between the first party and the second party;

broadcast, via the network interface, the third cryptographic hash value to a subrogation demand smart contract deployed to a distributed ledger and maintained by a plurality of participants in a distributed ledger network as a proof of agreement of the supplemental settlement between the first and second party, wherein the subrogation demand smart contract compares the third cryptographic hash value submitted by the first party to a fourth cryptographic hash value submitted by the second party to determine if there is a match;

obtain an indication from the subrogation demand smart contract that the third and fourth cryptographic hash values match indicating there is proof of agreement between the first party and second party; and append the supplemental settlement amount to the set of settlement amounts between the first party and the second party agreed upon over the threshold time period to determine the net settlement amount with the second party over the threshold time period.

19. The computer system of claim 18, wherein the settlement amount is a partial settlement amount based upon a subset of items or expenses in the subrogation claim.

* * * * *